(12) United States Patent
Asami et al.

(10) Patent No.: US 9,133,317 B2
(45) Date of Patent: Sep. 15, 2015

(54) COATING MATERIAL

(75) Inventors: Keiichi Asami, Sodegaura (JP); Masako Yoshida, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1076 days.

(21) Appl. No.: 12/087,157

(22) PCT Filed: Dec. 26, 2006

(86) PCT No.: PCT/JP2006/325970
§ 371 (c)(1),
(2), (4) Date: Jun. 27, 2008

(87) PCT Pub. No.: WO2007/077843
PCT Pub. Date: Jul. 12, 2007

(65) Prior Publication Data
US 2009/0162679 A1 Jun. 25, 2009

(30) Foreign Application Priority Data

Dec. 28, 2005 (JP) ................................. 2005-377788
Jan. 19, 2006 (JP) ................................. 2006-011719
Apr. 6, 2006 (JP) ................................. 2006-104864
May 30, 2006 (JP) ................................. 2006-149732

(51) Int. Cl.
| | | |
|---|---|---|
| C09D 123/10 | (2006.01) | |
| C09D 123/12 | (2006.01) | |
| C09D 123/14 | (2006.01) | |
| C08J 7/04 | (2006.01) | |
| C08G 18/08 | (2006.01) | |
| C08G 18/34 | (2006.01) | |
| C08G 18/48 | (2006.01) | |
| C08G 18/66 | (2006.01) | |
| C09D 5/00 | (2006.01) | |
| C09D 5/02 | (2006.01) | |
| C09D 123/00 | (2006.01) | |
| C09D 175/04 | (2006.01) | |
| B05D 1/02 | (2006.01) | |
| B05D 7/02 | (2006.01) | |
| B05D 7/14 | (2006.01) | |

(52) U.S. Cl.
CPC .............. *C08J 7/047* (2013.01); *C08G 18/0823* (2013.01); *C08G 18/34* (2013.01); *C08G 18/4854* (2013.01); *C08G 18/6666* (2013.01); *C09D 5/002* (2013.01); *C09D 5/02* (2013.01); *C09D 123/00* (2013.01); *C09D 123/10* (2013.01); *C09D 175/04* (2013.01); *B05D 1/02* (2013.01); *B05D 7/02* (2013.01); *B05D 7/14* (2013.01); *C08J 2323/00* (2013.01); *Y10T 428/31692* (2015.04); *Y10T 428/31913* (2015.04)

(58) Field of Classification Search
CPC ... C09D 123/10; C09D 123/12; C09D 123/14

USPC .......................................... 428/461; 525/240
See application file for complete search history.

(56) References Cited

U.S. PATENT DOCUMENTS

| | | | |
|---|---|---|---|
| 3,579,485 A | 5/1971 | Folzenlogen et al. | |
| 4,801,668 A * | 1/1989 | Beavers ........................ | 526/237 |
| 5,405,894 A | 4/1995 | Best | |
| 5,412,029 A | 5/1995 | Elm et al. | |
| 5,449,706 A | 9/1995 | Iwase et al. | |
| 5,767,188 A | 6/1998 | Kamikuri et al. | |
| 6,610,774 B2 | 8/2003 | Maekawa et al. | |
| 7,049,364 B2 | 5/2006 | Maekawa et al. | |
| 7,470,736 B2 | 12/2008 | Cooper | |
| 7,488,789 B2 | 2/2009 | Ikenaga et al. | |
| 7,601,778 B2 | 10/2009 | Matsunaga et al. | |
| 2003/0139515 A1 | 7/2003 | Asami et al. | |
| 2004/0249046 A1 * | 12/2004 | Abhari et al. ................. | 524/474 |
| 2005/0124753 A1 | 6/2005 | Ashihara et al. | |
| 2006/0247381 A1 | 11/2006 | Mori et al. | |
| 2007/0245929 A1 * | 10/2007 | Asami et al. .............| 106/287.18 |
| 2009/0018251 A1 | 1/2009 | Ashihara et al. | |

(Continued)

FOREIGN PATENT DOCUMENTS

| | | |
|---|---|---|
| EP | 0 972 794 A1 | 1/2000 |
| JP | 50-109616 | 4/1975 |

(Continued)

OTHER PUBLICATIONS

Collman et al. ("Principles and Applications of Organotransition Metal Chemistry", 1987, pp. 588-589).*

(Continued)

*Primary Examiner* — Peter F Godenschwager
(74) *Attorney, Agent, or Firm* — Foley & Lardner LLP

(57) ABSTRACT

There is provided a coating material comprising a mixture of a water-based resin composition of a thermoplastic elastomer (A) and/or a thermoplastic elastomer (B) in which at least one moiety is modified with a functional group; one of a water-based resin composition of a resin (G) formed from a copolymerizable monomer (G-1) which includes a monomer having an α,β-monoethylenic unsaturated group and other copolymerizable monomer, and a water-based resin composition of an urethane resin (U); and a water-based resin composition of a petroleum-based hydrocarbon resin (D) and/or a rosin-based resin (E) and/or a terpene-based resin (F). The coating material causing no separation phenomenon provides a coating composition or a primer with which spray coating is possible, and is a completely water-based coating material exhibiting an excellent adhesivity to a molded article of various resins such as polyolefin and a synthetic rubber or to metals such as a steel plate and aluminum.

10 Claims, No Drawings

(56) References Cited

U.S. PATENT DOCUMENTS

| | | |
|---|---|---|
| 2009/0061235 A1 | 3/2009 | Cooper |
| 2009/0162679 A1 | 6/2009 | Asami et al. |
| 2011/0046312 A1* | 2/2011 | Sogoh et al. .......... 525/240 |

FOREIGN PATENT DOCUMENTS

| | | |
|---|---|---|
| JP | 62-21027 | 1/1987 |
| JP | 1-256556 | 10/1989 |
| JP | 2-133481 | 5/1990 |
| JP | 3-160042 | 7/1991 |
| JP | 04-46904 | 2/1992 |
| JP | 4-72337 | 3/1992 |
| JP | 04-88025 | 3/1992 |
| JP | A-4-089854 | 3/1992 |
| JP | A-4-255771 | 9/1992 |
| JP | 4-351681 | 12/1992 |
| JP | 6-503849 | 4/1994 |
| JP | 6-199918 | 7/1994 |
| JP | 6-57809 | 8/1994 |
| JP | 06-336568 A | 12/1994 |
| JP | 7-157527 | 6/1995 |
| JP | 8-176309 | 7/1996 |
| JP | 11-199829 | 7/1999 |
| JP | A-2000-345097 | 12/2000 |
| JP | A-2002-294020 | 10/2002 |
| JP | A-2003-064111 | 3/2003 |
| JP | 2004-002578 | 1/2004 |
| JP | 2004-27055 | 1/2004 |
| JP | A-2004-067795 | 3/2004 |
| JP | 2004-115712 | 4/2004 |
| JP | A-2004-168845 | 6/2004 |
| JP | 2004-182896 A | 7/2004 |
| JP | 2004-307848 | 11/2004 |
| JP | 2004-307849 | 11/2004 |
| JP | 2005-002137 | 1/2005 |
| JP | 2007-39645 | 2/2007 |
| JP | A-2012-132015 | 7/2012 |
| WO | WO2004/074374 A1 | 9/2004 |
| WO | WO 2004/087775 A1 | 10/2004 |
| WO | WO 2004/101679 A1 | 11/2004 |
| WO | WO 2004/106430 | 12/2004 |
| WO | WO 2005/108518 A2 | 11/2005 |

OTHER PUBLICATIONS

Office Action issued Apr. 1, 2010 in corresponding Korean Application No. 9-5-2010-013828908 (3 pgs).

Office Action issued Apr. 30, 2010 in corresponding Chinese Application No. 200680049623.1 (5 pgs.).

Korean Office Action issued Dec. 17, 2009 in the corresponding Korean Application No. 9-5-2009-051989715 (5 pages).

Supplementary European Search Report mailed Jun. 17, 2009, received in European Application No. 06843354.9.

Office Action dated Dec. 20, 2011, in corresponding Japanese Patent Application No. JP 2007-552946, 3 pgs.

Office Action Japanese Application No. 2007-552946 dated Nov. 13, 2012.

Office Action issued in Japanese Application No. 2012-030438 dated Nov. 12, 2013.

Office Action issued in Japanese Application No. 2012-030439 dated Sep. 10, 2013.

* cited by examiner

COATING MATERIAL

TECHNICAL FIELD

The present invention relates to a coating material provided as a coating composition and a primer for non-treated polyolefin resin films/sheets or molded products, or a coating composition and a primer for metals such as a steel plate and aluminum, to give a coated film.

BACKGROUND ART

Conventionally, since a polyolefin resin in general has many advantages such as having good productivity and being excellent in various kinds of moldability, as well as being lightweight, and having a corrosion resistance and an impact resistance, it has been widely used as for interiors and exteriors of automobiles or ships, household electric appliances or household furnishings, miscellaneous goods, and building materials. Such polyolefin-based resin molded product differs from a synthetic resin having a polarity, which is generally typified by a polyurethane resin, a polyamide resin, an acrylic resin, and a polyester resin, that the polyolefin resin is a non-polar and crystalline resin. Thus, with the generalized resin composition, it is extremely difficult to perform coating or adhering thereto.

Accordingly, when coating or adhering is performed on the polyolefin-based resin molded product, its surface has been activated with chromic acid, flame, corona discharge, plasma, or a solvent, such to enhance the adhesion to the surface. For example, for a bumper of automobiles, the surface is treated by etching with a halogen-based organic solvent such as trichloroethane, such to increase the adhesivity with a coated film, or a pretreatment such as a corona discharge treatment, a plasma treatment, and an ozone treatment is performed followed by carrying out the aimed coating or adhesion. In addition, the method of treating a surface of the substrate such as molded articles with a primer has chosen, and for example, there proposed a composition in which the polyolefin is introduced with maleic acid (Patent Document 1) or a composition in which chlorinated modified polyolefin is employed as a main component (Patent Document 2).

Metals such as a steel plate is also used in a wide range of fields such as interiors and exteriors for automobiles or ships, household electric appliances or household furnishings, miscellaneous goods, and building materials. The surface of a steel plate is coated for the main purposes of improving the appearance and giving an anti-corrosive property. In particular, it is important to prevent the cracks and abrasion of a coated film which are caused by a distortion due to an external force or an impact of materials. Currently, in order to prevent the problems, the thickness of a coated film is increased, or ones coated with a modified propylene-ethylene copolymer (Patent Document 3) obtained by graft copolymerizing maleic acid or anhydrides thereof are employed. However, since those include an organic solvent such as toluene and xylene, there has been a concern about the problems of safety and environment pollution. For such reason, there proposed a substance obtained by dispersing a composition, in which chlorinated modified polyolefin is employed as a main component, in water (Patent Document 4), and a substance obtained from an olefin polymer and a petroleum-based hydrocarbon resin (Patent Document 5).

However, since those substances employ a large amount of surfactant to be a water-based substance, problems arise in that the water resistance of a coated film and adhesivity to a substrate decrease and that the stickiness is generated due to its bleeding out to the surface. When the used amount of the surfactant which is the cause of above problems is reduced, problems arise in that the aqueous base cannot be formed or that the stability of an aqueous resin composition is poor. Further, there is a problem that the most of them cannot exhibit a sufficient adhesivity against a substrate.

Patent Document 1: Japanese Examined Patent Publication No. S62-21027
Patent Document 2: Japanese Examined Patent Publication No. S50-10916
Patent Document 3: Japanese Examined Patent Publication No. H06-057809
Patent Document 4: Japanese Unexamined Patent Publication No. H01-256556
Patent Document 5: Japanese Unexamined Patent Publication No. 2004-27055

DISCLOSURE OF THE INVENTION

Problem to be Solved by the Invention

The present invention is made to overcome the abovementioned problems, and is aimed to provide a water-based coating material which shows an excellent adhesivity with a molded article of various resins formed from polyolefin such as polypropylene, a synthetic rubber, unsaturated polyester, an epoxy resin, or an urethane resin, or with metals such as a steel plate and aluminum.

Means to Solve the Problem

The present inventors have conducted extensive studies and examined to solve the above problems, and as a result they have found that the above object is effectively achieved by a coating material obtained by mixing a water-based resin composition of a thermoplastic elastomer (A) and/or a thermoplastic elastomer (B) in which at least one moiety is modified with a functional group; one of a water-based resin composition of a resin (G) formed from a copolymerizable monomer (G-1) which includes a monomer having an α,β-monoethylenic unsaturated group and other copolymerizable monomer, and a water-based resin composition of an urethane resin (U); and a water-based resin composition of a petroleum-based hydrocarbon resin (D) and/or a rosin-based resin (E) and/or a terpene-based resin (F). Thus, they have completed the invention.

That is, the invention is a coating material comprising 10 to 98 parts by weight of a water-based resin composition of the thermoplastic elastomer (A) and/or the thermoplastic elastomer (B) in which at least one moiety is modified with a functional group; 1 to 89 parts by weight of one of a water-based resin composition of the resin (G) formed from the copolymerizable monomer (G-1) which includes a monomer having an α,β-monoethylenic unsaturated group and other copolymerizable monomer, and a water-based resin composition of the urethane resin (U); and 1 to 89 parts by weight of a water-based resin composition of the petroleum-based hydrocarbon resin (D) and/or the rosin-based resin (E) and/or the terpene-based resin (F), in which the (A) and/or (B), (G) or (U), and (D) and/or (E) and/or (F) are mixed to give the total of 100 parts by weight.

Herein, the thermoplastic elastomer (A) is preferably a propylene-based elastomer (A-1) having (1)(a) 50 to 93 mol % of units derived from propylene, (b) 5 to 48 mol % of units derived from α-olefin having 4 to 20 carbon atoms, and (c) 2 to 40 mol % of units derived from ethylene, in such proportion (herein, the sum of structural units derived from propylene, structural unit derived from ethylene, and structural units derived from α-olefin having 4 to 20 carbon atoms is 100 mol %); (2) an intrinsic viscosity [η] measured at 135° C. in decalin of 0.1 to 12 dl/g; and (3) a molecular weight distribution (Mw/Mn) determined by gel permeation chromatography (GPC) of 3.0 or less, and/or is preferably a propylene-based elastomer (A-2) having (1) (a) 50 to 95 mol % of units derived from propylene and (b) 5 to 50 mol % of units derived from α-olefin having 4 to 20 carbon atoms; (2) an intrinsic viscosity [η] measured at 135° C. in decalin of 0.1 to 12 dl/g; and (3) a molecular weight distribution (Mw/Mn) determined by gel permeation chromatography (GPC) of 3.0 or less.

In addition, the thermoplastic elastomer (A) preferably comprises a propylene-based elastomer (A-3) having a melting point measured by differential scanning calorimetry (DSC) of below 100° C. or no observed melting point, and an isotactic polypropylene (A-4).

The propylene-based elastomer (A-3) having a melting point measured by differential scanning calorimetry (DSC) of below 100° C. or no observed melting point is a propylene homopolymer, or a copolymer of propylene and at least one α-olefin having 2 to 20 carbon atoms excluding propylene, while it is preferable that the ethylene content is from 0 to 30 mol % and the α-olefin having 4 to 20 carbon atoms is from 0 to 30 mol %.

Further, the invention relates to a coating composition and a primer which are obtained from the coating material, and to a coated film. The substrate used for the invention is preferably a polyolefin-based resin or a metal.

Effect of the Invention

According to the invention, the coating material can be directly used without causing a separation phenomenon, and a completely water-based coating material which is a coating composition or a primer with which spray coating is possible and has an effect not provided conventionally of exhibiting an excellent adhesivity to a molded article of various resins such as polyolefin and a synthetic rubber or to metals such as a steel plate and aluminum can be obtained. In addition, the invention is preferably used for a coating composition or a primer which can employ a curing agent capable of reacting with active hydrogen and/or a hydroxyl group.

BEST MODE FOR CARRYING OUT THE INVENTION

The coating material of the invention can be obtained by mixing water-based resin compositions obtained according to the methods described below.

Thermoplastic Elastomer (A)

The thermoplastic elastomer (A) useful in the invention can be exemplified by thermoplastic elastomers which are a homopolymer or a copolymer of one or two or more kinds of α-olefin(s) such as ethylene, propylene, 1-butene, 3-methyl-1-butene, 4-methyl-1-pentene, 3-methyl-1-pentene, 1-heptene, 1-hexene, 1-octene, 1-decene, and 1-dodecen, represented by polyethylene, polypropylene, poly-1-butene, poly-3-methyl-1-butene, poly-3-methyl-1-pentene, poly-4-methyl-1-pentene, an ethylene-propylene copolymer, an ethylene-1-butene copolymer, a propylene-1-butene copolymer, and an ethylene-propylene-1-butene copolymer. In addition, alicyclic structure-containing polymers such as a norbornene-based polymer, a monocyclic polyolefin-based polymer, a cyclic conjugated diene-based polymer, a vinyl alicyclic hydrocarbon polymer, and their hydrogenated products, may also be employed.

Among the above, the ethylene-butene copolymer, the ethylene-propylene copolymer, the ethylene-octene copolymer, the ethylene-propylene-butene copolymer, the propylene-butene copolymer, and the propylene-octene copolymer are preferable, and these may be used alone or in combination of two or more kinds. In addition, the weight average molecular weight (Hereinafter, abbreviated as Mw. The weight average molecular weight can be, for example, measured in terms of polystyrene with gel permeation chromatography (GPC)) is within the range of usually 10,000 to 700,000, and preferably 30,000 to 50,000.

The thermoplastic elastomer (A) can be further exemplified by hydrogenated products of a styrene-conjugated diene block copolymer, hydrogenated products of a styrene-conjugated diene random copolymer, or the like, and a composition of the hydrogenated products of the styrene-conjugated diene block copolymer can be exemplified by hydrogenated products of a styrene-conjugated diene diblock copolymer, hydrogenated products of a styrene-conjugated diene-styrene triblock copolymer, or the like. The conjugated diene used herein can be exemplified by butadiene, isoprene, or the like. Among the above, the hydrogenated product of a styrene-isoprene-styrene triblock copolymer and the hydrogenated product of a styrene-butadiene random copolymer are preferable.

The thermoplastic elastomer (A) used herein has a styrene content in the range of usually 2 to 60 wt % and more preferably 3 to 45 wt %. The weight average molecular weight (hereinafter, abbreviated as Mw) is preferably in the range of 10,000 to 700,000, and for the hydrogenated products of a styrene-isoprene-styrene copolymer, the weight average molecular weight is preferably from 15,000 to 500,000. For the hydrogenated products of a styrene-butadiene copolymer, the weight average molecular weight is from 10,000 to 700,000 and more preferably from 50,000 to 500,000. The above thermoplastic elastomer can be used alone or in a combination of two or more kinds.

In the invention, the thermoplastic elastomer (A) preferably contains the following propylene-based elastomer (A-1) and/or (A-2).

Additionally in the invention, the thermoplastic elastomer (A) preferably contains the following propylene-based elastomer (A-3) having a melting point measured by differential scanning calorimetry (DSC) of below 100° C. or no observed melting point and the following isotactic polypropylene (A-4).

Propylene-Based Elastomer (A-1)

The propylene-based elastomer (A-1) of the invention satisfies the following (1) to (3).

(1) (a) 50 to 93 mol % and preferably 50 to 85 mol % of units derived from propylene, (b) 5 to 48 mol % and preferably 5 to 25 mol % of units derived from α-olefin having 4 to 20 carbon atoms, and (c) 2 to 40 mol % and preferably 5 to 25 mol % of units derived from ethylene, are contained in such proportion, while the proportion of units derived from α-olefin having 4 to 20 carbon atoms is more preferably greater than the proportion of units derived from ethylene (here, the sum of structural units derived from propylene, structural unit derived from ethylene, and structural units derived from α-olefin having 4 to 20 carbon atoms is 100 mol %).

In addition, the structural units derived from ethylene and the structural units derived from α-olefin having 4 to 20 carbon atoms are preferably from 60 to 15 mol %. In addition, the α-olefin having 4 to 20 carbon atoms is preferably 1-butene.

(2) The intrinsic viscosity [η] measured at 135° C. in decalin is from 0.1 to 12 dl/g, preferably from 3 to 10 dl/g, and more preferably from 0.5 to 8 dl/g.

(3) The molecular weight distribution (Mw/Mn, in terms of polystyrene, Mw: weight average molecular weight, Mn: number average molecular weight) determined by gel permeation chromatography (GPC) is 3.0 or less, preferably from 1.5 to 3.0, and more preferably from 1.5 to 2.5.

It is desirable that the melting point Tm (° C.) of the propylene-based elastomer (A-1), which is measured by DSC, is preferably 50° C. or below or not observed, but more preferable that the melting point is not observed. The melting point is measured and determined by taking the temperature at the endotherm peak as a melting point Tm, where the endotherm peak is observed when a sample is filled in an aluminum pan, then heated to 200° C. at a rate of 100° C./min, maintained at 200° C. for 5 minutes, next cooled to −150° C. at a rate of 10° C./min, and subsequently heated to 200° C. at a rate of 10° C./min. When the melting point Tm is within the above range, a coating material excellent in the balance of flexibility and strength is obtained.

Propylene-Based Elastomer (A-2)

The propylene-based elastomer (A-2) of the invention satisfies the following (1) to (3).

(1) (a) 50 to 95 mol % and preferably 65 to 90 mol % of units derived from propylene and (b) 5 to 50 mol % and preferably 10 to 35 mol % of units derived from α-olefin having 4 to 20 carbon atoms, are contained. The α-olefin having 4 to 20 carbon atoms is preferably 1-butene.

(2) The intrinsic viscosity [η] measured at 135° C. in decalin is from 0.1 to 12 dl/g, preferably from 3 to 10 dl/g, and more preferably from 0.5 to 8 dl/g.

(3) The molecular weight distribution (Mw/Mn, in terms of polystyrene, Mw: weight average molecular weight, Mn: number average molecular weight) determined by gel permeation chromatography (GPC) is 3.0 or less, preferably from 1.5 to 3.0, and more preferably from 1.5 to 2.5.

For the melting point Tm (° C.) of the propylene-based elastomer (A-2) which is measured by DSC, the melting point Tm and the content M (mol %) of comonomer structural units obtained from $^{13}$C-NMR spectral measurement, preferably satisfy the relational expression of:

$$146\exp(-0.022\,M) \geq Tm \geq 125\exp(-0.032\,M)$$

(provided that the melting point Tm is below 120° C. and preferably below 100° C.).

The melting point Tm is measured by DSC in the following manner. That is, the temperature at an endotherm peak is taken as a melting point Tm, in which the endotherm peak is observed when a sample filled in an aluminum pan is heated to 200° C. at a rate of 100° C./min, after being heated to 200° C. maintained at 200° C. for 5 minutes, then cooled to −150° C. at a rate of 10° C./min, and subsequently heated to 200° C. at a rate of 10° C./min. The melting point Tm is usually below 120° C., preferably below 100° C., more preferably in the range of 45 to 95° C., and even more preferably in the range of 50 to 90° C. When the melting point Tm is within the above range, in particular, a coating material excellent in the balance of flexibility and strength is obtained.

The propylene-based elastomers (A-1) and (A-2) can be produced, for example, according to the method disclosed in Pamphlet of International Publication WO 2004/087775.

Propylene-Based Elastomer (A-3)

The propylene-based elastomer (A-3) (hereinafter, also may be referred to as propylene•ethylene•α-olefin copolymer (A-3)) useful in the invention which has a melting point measured by differential scanning calorimetry (DSC) of below 100° C. or no observed melting point can be exemplified by propylene homopolymers or copolymers of propylene and at least one α-olefin having 2 to 20 carbon atoms excluding propylene such as ethylene, 1-butene, 3-methyl-1-butene, 4-methyl-1-pentene, 3-methyl-1-pentene, 1-heptene, 1-hexene, 1-octene, 1-decene, and 1-dodecen, and the propylene-based elastomer (A-3) preferably has the ethylene content of 0 to 30 mol % and the α-olefin having 4 to 20 carbon atoms content of 0 to 30 mol %. Particularly in the elastomer comprising a propylene component, an ethylene component, and an α-olefin component, the propylene•ethylene•α-olefin copolymer contains preferably in the amount of 45 to 98 mol % of the propylene component, 1 to 30 mol % of the ethylene component, and 1 to 30 mol % of the α-olefin component, more preferably in the amount of 69 to 96 mol % of the propylene component, 2 to 30 mol % of the ethylene component, and 2 to 30 mol % of the α-olefin component, and even more preferably in the amount of 61 to 85 mol % of the propylene component, 10 to 14 mol % of the ethylene component, and 5 to 25 mol % of the α-olefin component. Among the α-olefins, butene and 1-octene are preferable.

The propylene•ethylene•α-olefin copolymer (A-3) containing such amount of structural units derived from propylene and if necessary such amount of structural units derived from ethylene and structural units derived from α-olefin having 4 to 20 carbon atoms, has good compatibility with the isotactic polypropylene (A-4), and thus obtained propylene-based polymer composition tends to exhibit a sufficient transparency, flexibility, heat resistance, and scratch resistance.

The intrinsic viscosity [η] of the propylene•ethylene•α-olefin copolymer (A-3) as measured in decalin at 135° C. is desirably within the range of usually from 0.01 to 10 dl/g and preferably from 0.05 to 10 dl/g. When the intrinsic viscosity [η] of the propylene•ethylene•α-olefin random copolymer is in the above range, a propylene•ethylene•α-olefin random copolymer having excellent properties of weather resistance, ozone resistance, thermal aging resistance, low temperature characteristic, and resistance to dynamic fatigue can be obtained.

The crystallinity of the propylene•ethylene•α-olefin copolymer (A-3) measured by X-ray diffraction is usually 20% or less and preferably from 0 to 15%. In addition, the propylene•ethylene•α-olefin copolymer (A-3) has single glass transition temperature, and the glass transition temperature Tg measured by differential scanning calorimetry (DSC) is desirably within the range of usually −10° C. or below and preferably −15° C. or below. When the glass transition temperature Tg of the propylene•ethylene•α-olefin copolymer is in the above range, excellent cold resistance and low temperature characteristic are provided.

In addition, the molecular weight distribution (Mw/Mn, in terms of polystyrene, Mw: weight average molecular weight, Mn: number average molecular weight) as measured with GPC is preferably 4.0 or less, more preferably 3.0 or less, and more preferably 2.5 or less, and the propylene•ethylene•α-olefin copolymer (A-3) can be produced in a metallocene catalyst system which includes a metallocene compound as a catalyst component, but may not be limited by this.

The propylene•ethylene•α-olefin copolymer (A-3) useful in the invention has the melting point determined by differential scanning calorimetry (DSC) of preferably below 100° C. in usual and more preferably has no observed melting point. The "no observed melting point" means that there is no observed crystalline melting peak having a heat of crystalline fusion of 1 J/g or more within the range of −150 to 200° C. The measurement conditions are as described in Example.

The triad tacticity (mm fraction) of the propylene•ethylene•α-olefin copolymer (A-3) measured by $^{13}$C-NMR is preferably 85% or more, more preferably 85 to 97.5% or less, more preferably 87 to 97%, and particularly preferably 90 to 97%. When the triad tacticity (mm fraction) is in the above range, a balance between the flexibility and the mechanical strength is particularly excellent, thus it is suitable for the invention. The mm fraction can be measured according to a method described from line 7 on page 21 to line 6 on page 26 in Pamphlet of International Publication WO 2004/087775.

Isotactic Polypropylene (A-4)

The isotactic polypropylene (A-4) useful in the invention is a polypropylene having the isotactic pentad fraction (mmmm) of 0.9 or more and preferably 0.95 or more as measured by the NMR technique.

The isotactic pentad fraction (mmmm) is measured and calculated according to the method disclosed in Japanese Unexamined Patent Publication No. 2003-147135.

The isotactic polypropylene (A-4) can be exemplified by a propylene homopolymer or a copolymer of propylene and at least one α-olefin having 2 to 20 carbon atoms excluding propylene. Here, the α-olefin having 2 to 20 carbon atoms excluding propylene can be exemplified by ethylene, 1-butene, 1-pentene, 1-hexene, 4-methyl-1-pentene, 1-octene, 1-decene, 1-dodecen, 1-tetradecene, 1-hexadecene, 1-octadecene, 1-eicosen, or the like, but ethylene and α-olefin having 4 to 10 carbon atoms are preferable.

These α-olefins may form a random copolymer or may also form a block copolymer with propylene.

The structural units derived from the α-olefins are contained in the polypropylene in a proportion of 35 mol % or less and preferably 30 mol % or less.

It is desirable that the isotactic polypropylene (A-4) has a melt flow rate (MFR) in the range of 0.01 to 1,000 g/10 min, preferably 0.05 to 100 g/10 min, as measured at 230° C. under a load of 2.16 kg according to ASTM D 1238.

According to necessity, a plurality of isotactic polypropylenes (A-4) can be used in combination, for example, two or more components with different melting point or rigidity can be used.

The isotactic polypropylene (A-4) can be selected from homopolypropylene having excellent heat resistance (usually, well known ones having a copolymer component excluding propylene of 3 mol % or less), block polypropylene having excellent balance between the heat resistance and the flexibility (usually, well known ones having a normal decane elution rubber component of 3 to 30 wt %), and random polypropylene having excellent balance between the flexibility and the transparency (usually, well known ones having the melting point measured by DSC in the range of 110 to 150° C.), or these can be used in selection or in combination, to obtain a target property.

Such isotactic polypropylene (A-4) can be produced by, for example, conducting polymerization or copolymerization with the use of propylene and other α-olefin under a Ziegler catalyst system comprising a solid catalyst component containing magnesium, titanium, halogen, and an electron donor as an essential component, an organoaluminum compound, and an electron donor, or under a metallocene catalyst system including a metallocene compound as a catalyst component.

Here, the thermoplastic elastomer (A) preferably comprises 50 to 99.5 wt % of the propylene-based elastomer (A-3) and 0.5 to 50 wt % of the isotactic polypropylene (A-4) ((A-3)+(A-4)=100 wt %).

[Thermoplastic Elastomer (B) in which at Least One Moiety is Modified with Functional Group]

The thermoplastic elastomer (B) useful in the invention in which at least one moiety is modified with a functional group can be obtained by subjecting the above-mentioned thermoplastic elastomer (A) alone or the mixture of two or more kinds thereof to the reaction with a copolymerizable monomer (G-2) which contains the functional group described below and comprises a monomer having an α,β-monoethylenic unsaturated group and other copolymerizable monomer, but unreactive ones may be partly included.

The copolymerizable monomer (G-2) useful herein which contains a functional group and comprises a monomer having an α,β-monoethylenic unsaturated group and other copolymerizable monomer can be exemplified by hydroxyl group-containing vinyls such as hydroxy ethylacrylate, 2-hydroxyethyl(metha)acrylate, 2-hydroxypropyl(metha)acrylate, 4-hydroxy butylacrylate, lactone-modified hydroxyethyl (metha)acrylate, 2-hydroxy-3-phenoxypropylacrylate, and the like; carboxyl group-containing vinyls such as acrylic acid, methacrylic acid, maleic acid, itaconic acid, ω-carboxypolycaprolactone monoacrylate, monohydroxyethyl acrylate phthalate, and the like; nitrogen compounds such as acrylamide, methacrylamide, methylolacrylamide, methylol methacrylamide, dimethylaminoethyl(metha)acrylate, and the like; or anhydrous carboxylic acid such as maleic anhydride, anhydrous citraconic acid, and the like. These may be used alone or in a combination of two or more kinds.

The amount of the functional group used for the thermoplastic elastomer (B) in which at least one moiety is modified with a functional group is in the range of usually 0.5 to 20 wt % and preferably 0.5 to 15 wt %, of a weight amount of the thermoplastic elastomer (A) in the added amount of the copolymerizable monomer including a monomer having an α,β-monoethylenic unsaturated group and other copolymerizable monomer.

The thermoplastic elastomer (B) in which at least one moiety is modified with a functional group can be obtained by various methods, and examples of the method include a method which comprises reacting the thermoplastic elastomer (A) and the copolymerizable monomer (G-2) in an organic solvent (H) described below in the presence of a polymerization initiator (I-1) described below, and subjecting to a desolvation; a method which comprises obtaining a molten material by melting the thermoplastic elastomer (A) under heating, and subjecting to the reaction with the copolymerizable monomer (G-2) and the polymerization initiator (I-1) under stirring; a method which comprises mixing the thermoplastic elastomer (A), the copolymerizable monomer (G-2), and the polymerization initiator (I-1), and subjecting to the reaction after being supplied to an extruder under heat-kneading; and the like.

As the organic solvent (H) which can be used herein, organic solvents such as aromatic hydrocarbon e.g., xylene, toluene, ethyl benzene, etc.; aliphatic hydrocarbon e.g., hexane, heptane, octane, decane, isooctane, isodecane, etc.; alicyclic hydrocarbon e.g., cyclohexane, cyclohexene, methylcyclohexane, ethylcyclohexane, etc.; ester type e.g., ethyl acetate, n-butyl acetate, cellosolve acetate, propylene glycol-monomethyl ether acetate, propylene glycol monoethyl ether acetate, 3methoxybutyl acetate, etc.; ketone-based solvents e.g., methylethyl ketone, methyl isobutyl ketone, etc.; alcohols e.g., isopropyl alcohol, n-butylalcohol, isobutyl alcohol, etc.; ether type e.g., methyl cellosolve, cellosolve (ethylcellosolve), butylcellosolve, methylcarbitol, ethylcarbitol, butylcarbitol, etc.; and the like can be used, and a mixture of two or more kinds thereof may also be used. Among these, the aromatic hydrocarbon, the aliphatic hydrocarbon, and the alicyclic hydrocarbon are preferable, and the aliphatic hydrocarbon and the alicyclic hydrocarbon are more preferably used.

The polymerization initiator (I-1) useful in the invention can be exemplified by organic peroxides such as di-tert-butyl peroxide, tert-butyl peroxyl-2-ethyl hexanoate, benzoyl peroxide, dichloro benzoyl peroxide, dicumyl peroxide, lauroyl peroxide, tert-butyl peroxyl benzoate, 2,5-dimethyl-2,5-di(peroxy benzoate)hexyne-3,1,4-bis(tert-butyl peroxyl isopropyl)benzene, lauroyl peroxide, tert-butyl peracetate, 2,5-dimethyl-2,5-di(tert-butyl peroxyl)hexyne-3,2,5-dimethyl-2,5-di(tert-butyl peroxide)hexane, tert-butyl benzoate, tert-butyl perphenylacetate, tert-butyl perisobutyrate, tert-butyl per-sec-octoate, tert-butyl perpivalate, and cumene hydroperoxide; azo compounds such as azobisisobutyronitrile, 4,4'-azobis(4-cyanopenta acid), and 2,2'-azobis(2-methyl-N-(2-hydroxyethyl)propioamide); and the like. These can be used alone or in a combination of two or more kinds.

The obtained thermoplastic elastomer (A) and/or the thermoplastic elastomer (B) in which at last one moiety is modified with a functional group can be dispersed in water using a salt of acid-modified polyolefin (J) and/or a salt of higher fatty acid (K) in accordance with the following method.

The salt of the acid-modified polyolefin (J) useful in the invention is the olefin-based resin which contains a salt group of carboxylic acid (in the case of partially neutralized material and partially saponified material, carboxylic acid is included) bonded to a polymer chain of the polyolefin in the concentration of 0.05 to 5 mmol and preferably 0.1 to 4 mmol per 1 gram of the resin as a —COO— group.

The acid-modified polyolefin (J), for example, can be obtained by graft copolymerizing polyolefin formed from α-olefin or the like with a monomer having a neutralized or non-neutralized carboxylic acid group and/or a monomer having saponified or non-saponified carboxylate ester.

Regarding to the molecular weight of the acid-modified polyolefin (J), a polymer of α-olefin alone or a copolymer of two or more kinds of α-olefin having the number average molecular weight (Mn) measured with GPC in the range of 500 to 10,000 is preferable. Specific examples of the α-olefin include ethylene, propylene, butene, pentene, hexane, octane, and the like. Among these, an ethylene homopolymer, a propylene homopolymer, and an ethylene-propylene copolymer are particularly preferable.

Examples of the monomer having a neutralized or non-neutralized carboxylic acid group and the monomer having a saponified or non-saponified carboxylate ester group include ethylene-based unsaturated carboxylic acid, anhydrides and esters thereof, and the like.

Here, the ethylene-based unsaturated carboxylic acid can be exemplified by (metha)acrylic acid, maleic acid, fumaric acid, tetrahydro phthalic acid, itaconic acid, citraconic acid, crotonic acid, isocrotonic acid, or the like, the anhydrides thereof can be exemplified by Nadic Acid™ (endocis-bicyclo[2,2,1]hept-5-ene-2,3-dicarboxylic acid), maleic anhydride, citraconic anhydride, or the like, and the unsaturated carboxylate ester can be exemplified by monoesters or diesters such as methyl, ethyl, and propyl, of the ethylene-based unsaturated carboxylic acid. The monomers can be employed alone or in plural kinds.

In order to produce a modified product by graft copolymerizing a graft monomer selected from the above monomers to a polymer to be grafted, various kinds of conventionally well-known methods can be employed. For example, a method which comprises melting a polymer to be grafted to add a graft monomer and subjecting to a graft copolymerization, a method which comprises melting in an organic solvent to add a graft monomer and subjecting to a graft copolymerization, and the like can be mentioned. In any case, it is preferable to carry out the reaction in the presence of a polymerization initiator to effectively graft copolymerize the graft monomer.

The graft reaction is carried out at the temperature of usually 60 to 350° C. The proportion of the polymerization initiator used is usually in the range of 0.01 to 20 parts by weight, based on 100 parts by weight of the polymer to be grafted. As the polymerization initiator, the polymerization initiator (I-1) mentioned above can be exemplified. Among the polymerization initiator, dialkyl peroxides such as dicumyl peroxide, di-tert-butylperoxide, 2,5-dimethyl-2,5-di(tert-butylperoxy)hexyne-3,2,5-dimethyl-2,5-(tert-butylperoxy)hexane, and 1,4-bis(tert-butylperoxy isopropyl)benzene are preferable.

The basic substance useful for neutralization and saponification can be exemplified by alkali metals such as sodium and potassium, inorganic amines such as hydroxylamine and ammonium hydroxide, organic amines such as methylamine and ethanolamine, ammonia, sodium oxide, sodium peroxide, oxides of alkali metals and alkali earth metals, hydroxide, and weak acid salts of alkali metals and alkaline earth metals such as sodium carbonate.

As the carboxylic acid group or the carboxylate ester group neutralized or saponified with the basic substance, alkali metal salts of carboxylic acids such as sodium carboxylate and potassium carboxylate, and ammonium carboxylate are preferable. Among these, potassium carboxylate is preferable.

As the salts of higher fatty acid (K) useful in the invention, preferably salts of fatty acid having 25 to 60 carbon atoms, more preferably alkali metal salts, alkali earth metal salts, and amine salts, of fatty acid having 25 to 40 carbon atoms, can be exemplified. Preferred examples include alkali metal salts of montanic acid and oleic acid. In addition, the salts of higher fatty acid (K) may include higher fatty acid and/or esters of higher fatty acid, in addition to the higher fatty acid salt. The alcohol residue constituting ester has preferably 2 to 30 carbon atoms, and particularly preferably 6 to 20 carbon atoms. The residue may be in any of linear and branched forms, and may be a mixture of ones having different number of carbon atoms. Specific examples of the alcohol residue include residues of higher alcohol such as cetyl alcohol, stearyl alcohol, and oleyl alcohol. Here, ester wax of montanic acid and montan wax are particularly preferable.

The salt of higher fatty acid (K) can be obtained by neutralizing the above higher fatty acid and/or saponifying the above ester of higher fatty acid. In this case, partially neutralized product or partially saponified product where non-neutralized or non-saponified fatty acid or fatty acid ester is coexisted may also be employed. As the basic substance capable of being used for neutralization and saponification, the above-mentioned basic substances can be exemplified.

In order to improve the stability of dispersion in water, various surfactants (L) can also be used. Examples include anionic surfactants such as alkyl naphthalenesulfonate and metallic soaps (Zn, Al, Na, and K salts); nonionic surfactants such as fatty acid monoglyceride; alkylammonium chloride; amphoteric surfactants; and water-soluble polyvalent metal salts. These surfactants can be used alone or as a mixture of two or more kinds. The amount of the surfactant (L) used is preferably from about 0.05 to 40 wt %, more preferably from 0.1 to 20 wt %, and particularly preferably from 0.1 to 10 wt %, to the resin formed with the thermoplastic elastomer and the copolymerizable monomer including a monomer having an α,β-monoethylenic unsaturated group and other copolymerizable monomer.

The water-based composition of the thermoplastic elastomer (A) and/or the thermoplastic elastomer (B) in which at least one moiety is modified with a functional group, useful in the invention desirably contains each component in a certain range of quantitative ratio. That is, it is desirable that a salt of the acid-modified polyolefin (J) and/or a salt of the higher fatty acid (K) are/is included from 0.5 to 30 parts by weight and preferably from 1 to 20 parts by weight, based on 100 parts by weight of the thermoplastic elastomer (A) and/or the thermoplastic elastomer (B) in which at least one moiety is modified with a functional group.

In addition, the surfactant (L) which is added when desired is preferably blended in the range of 0.1 to 40 parts by weight and particularly preferably 0.2 to 20 parts by weight, per 100 parts by weight of the thermoplastic elastomer (A) and/or the thermoplastic elastomer (B) in which at least one moiety is modified with a functional group.

Further, the content of water is from 1 to 25 wt % and preferably from 1 to 20 wt %, to the thermoplastic elastomer (A) and/or the thermoplastic elastomer (B) in which at least one moiety is modified with a functional group. When the water content is below 1 wt %, the phase inversion (inversion of resin solid from continuous phase to dispersed phase due to water) hardly occurs, and thus preferred aqueous dispersion cannot be obtained. When the content exceeds 25 wt %, the aqueous dispersion tends to have a flow property. In other words, the solid-look aqueous dispersion can be obtained in the range of 1 to 25%.

The such mentioned water-based composition can be produced with the use of the thermoplastic elastomer (A) and/or the thermoplastic elastomer (B) in which at least one moiety is modified with a functional group, and the acid-modified polyolefin and/or the higher fatty acid preferably according to the methods such as a method in which the thermoplastic elastomer (A) and/or the thermoplastic elastomer (B) in which at least one moiety is modified with a functional group are/is melt-kneaded with the acid-modified polyolefin and/or the fatty acid and/or the fatty acid ester, then a basic substance and water are added thereto, the mixture is further melt-kneaded, then subjected to neutralization and/or saponification, and allowed a dispersion (phase inversion) of the thermoplastic elastomer (A) and/or the thermoplastic elastomer (B) in which at least one moiety is modified with a functional group to an aqueous phase; and a method in which water is preliminarily added as a basic substance to the acid-modified polyolefin and/or the fatty acid and/or the fatty acid ester, the mixture is neutralized and/or saponified, the resultant is melt-kneaded with the thermoplastic elastomer (A) and/or the thermoplastic elastomer (B) in which at least one moiety is modified with a functional group, then further melt-kneaded by adding more water to allow the dispersion (phase inversion) of the thermoplastic elastomer (A) and/or the thermoplastic elastomer (B) in which at least one moiety is modified with a functional group to an aqueous phase.

The former method is simpler and forms a small and uniform particle size, thus is preferable. The melt-kneading means used for the phase inversion may be any well known ones, but preferably can be exemplified by a kneader, a banbury mixer, or a multiscrew extruder.

The proportion of the basic substance added for neutralization or saponification is from 60 to 200% and preferably from 80 to 170%, of total carboxylic acid or carboxylate ester.

In addition, the aqueous dispersion obtained by the melt-kneading and the phase inversion includes 1 to 25% of water. This water content can be either used as it is or water may be further supplied to lower the viscosity.

Urethane Resin (U)

Examples of the polyfunctional isocyanate compound which is a component constituting a water-based resin composition of the urethane resin (U) useful in the invention include various aliphatic polyisocyanates such as ethylene diisocyanate, trimethylene diisocyanate, tetramethylene diisocyanate, hexamethylene diisocyanate, and octamethylene diisocyanate; alicyclic polyisocyanates such as isophorone diisocyanate, bis(isocyanato)cyclohexane, and 4,4-dicyclohexylmethane-diisocyanate; aromatic polyisocyanates such as phenylene diisocyanate, tolylene diisocyanate, and 4,4-diisocyanate; sulfur-containing aliphatic isocyanates such as thiodiethyl diisocyanate; aromatic sulfide-based isocyanates such as diphenyl sulfide-2,4'-diisocyanate; aliphatic disulfide-based isocyanates such as diphenyl disulfide-4,4'-diisocyanate; aromatic sulfone-based isocyanate such as diphenylsulphone-4,4'-diisocyanate; sulfonic acid ester-based isocyanates such as 4-methyl-3-isocyanato benzensulfonyl-4'-isocyanato phenol ester; aromatic sulphonic acid amide-based isocyanates such as 4,4-dimethylbenzenesulfonyl-ethylenediamine-4,4'-diisocyanate; sulfur-containing heterocyclic compounds such as thiophen-2,5-diisocyanate; and the like.

In addition, their alkyl substituent, alkoxy substituent, and nitro substituent; a prepolymer modified product with polyvalent alcohol, a carbodiimide modified product, an urea modified product, and a burette modified product; or a dimerized or trimerized reaction product, may be used, but polyfunctional isocyanate compounds other than the above-mentioned compounds may also be used. These polyfunctional isocyanate compounds may be used alone or as a mixture of two or more kinds.

Among the above compounds, from the points of yellowing resistance, heat stability, photo stability of the coating formed by coating the obtained resin, or from easy availability of polyfunctional isocyanate compound, aliphatic polyisocyanate and alicyclic polyisocyanate compounds are preferable, and of these, hexamethylene diisocyanate, isophorone diisocyanate, 4,4'-dicyclohexylmethane diisocyanate, 2,5-bisisocyanato methylnorbornane, 2,6-bisisocyanato methylnorbornane, and derivatives thereof are particularly preferable.

The active hydrogen compound which at least includes two active hydrogen groups capable of reacting with a polyfunctional isocyanate compound in one molecule can be exemplified by the following compounds. Various polyol compounds: aliphatic polyols such as ethylene glycol, propylene glycol, pentaerythritol, and sorbitol, aromatic polyols such as dihydroxynaphthalene and trihydroxy naphthalene, halogenated polyols such as dibromoneopentyl glycol, polyester polyol, polyethylene glycol, polyetherpolyol, polythioether polyol, and also, condensed reaction products of organic acid such as oxalic acid and adipic acid with the polyol, addition reaction product of the polyol with alkylene oxide such as ethylene oxide and propylene oxide, addition reaction product of alkylene polyamine and alkylene oxide, 2,2-dimethylol lacatic acid, 2,2-dimethylol proprionic acid, a caprolactone-modified product, 2-mercaptoethanol, 3-mercapto-1,2-propanediol, and the like can be mentioned. In addition, polyamino compounds such as ethylenediamine and diethylenetriamine, and α-amino acid such as serine, lysin, and histidine, can be employed.

In the invention, the active hydrogen compound preferably employs a compound having a straight-chained structure with no branched skeleton, and further preferably employs polyester polyol, polyetherpolyol, polycarbonate polyol, polycaprolactone polyol, polyolefin polyol, and copolymers or mixtures thereof, having the melting point (Tm) of 40° C. or below by 50 parts by weight or more to 98 parts by weight or less based on 100 parts by weight of total active hydrogen compound. When the used amount is below 50 parts by weight, the feeling property of coating obtained from an aqueous coating material tends to deteriorate, and when it is above 98 parts by weight, coating strength and rigidity tends to decrease. These compounds each may be used alone or as a mixture of two or more kinds.

In order to stabilize as a water-based resin composition of the urethane resin (U) useful in the invention, well known materials and stabilizing techniques may be used, but the molecule includes preferably one or more kinds of carboxyl group, sulfonyl group, and ethylene oxide group, and more preferably one or more of carboxyl groups and/or sulfonyl groups. As the constituent for introducing above atomic groups, for example, 2,2-dimethylol lactic acid, 2,2-dimethylol propionic acid, 2,2-dimethylol butanoic acid, 2,2-dimethylol valeric acid, 3,4-diaminobutane sulfonic acid, 3,6-diamino-2-toluenesulfonic acid, polyethylene glycol, an addition product of ethlyene oxide with propylene oxide, a polymer of ethylene glycol with the above-described active hydrogen compound, and the like can be mentioned, but may not be limited by those.

According to the introduction of those atomic groups into a molecule, the mechanical stability of the resin and the mixing stability with other component are likely to improve.

The preferred amount when using the above carboxyl group and/or sulfonyl group-containing compound is such that the acid value in terms of the solid content of the water-based resin composition of the urethane resin (U) is within the range of 2 to 35 KOHmg/g, and more preferably 3 to 30 KOHmg/g. When it is below the range of that acid value, the mechanical stability of the resin tends to reduce.

The production method of a water-based resin composition of the urethane resin (U) is not particularly limited, but the following methods can be exemplified. There are a method which comprises reacting a polyfunctional isocyanate compound, a compound having an active hydrogen group capable of reacting with the isocyanate group in the active hydrogen compound, and a compound having an active hydrogen group capable of reacting with the isocyanate group in the compound and having at least one of carboxyl group, sulfonyl group and ethylene oxide group in the molecule, where reacted in an equivalent ratio such that the isocyanate group is excessive and in the presence of or without a suitable organic solvent, so as to produce a urethane prepolymer having an isocyanate group at the molecular end, next neutralizing the ones having a carboxyl group and/or a sulfonyl group in the above prepolymer with the use of a neutralizing agent such as tertiary amine, subsequently charging this neutralized prepolymer in an aqueous solution containing a chain extender for carrying out the reaction, and then removing the organic solvent when present in the system, to obtain the composition; a method which comprises charging the non-neutralized urethane prepolymer obtained according to the previous method into an aqueous solution containing a neutralizing agent and a chain extender, and subjecting to the reaction to obtain the composition; a method which comprises adding an aqueous solution containing a chain extender to the neutralized urethane prepolymer obtained according to the previous method, and subjecting to the reaction to obtain the composition; and a method which comprises adding an aqueous solution containing a neutralizing agent and a chain extender to the non-neutralized urethane prepolymer obtained according to the previous method, and subjecting to the reaction to obtain an aqueous solution of dispersion.

The neutralizing agent useful in the invention is not particularly limited, but can be exemplified by alkanolamines such as N,N-dimethylethanolamine and N,N-diethyl ethanolamine; tertiary amines such as N-methylmorpholine, N-ethylmorpholine, pyridine, N-methylimidazole, ammonia, trimethylamine, and triethylamine; alkali metal compounds such as lithium hydroxide, potassium hydroxide, sodium hydroxide, calcium hydroxide, magnesium hydroxide, and aluminum hydroxide; and quaternary ammonium compounds such as tetramethylammonium hydroxide. These compounds may be used alone or as a mixture of two or more kinds.

The used amount of the neutralizing agent is preferably from 0.5 to 3 equivalent amounts and more preferably from 0.7 to 1.5 equivalent amounts, to 1 equivalent amount of the carboxyl group and/or the sulfonyl group in a polyurethane resin having the carboxyl group and/or the sulfonyl group. When the amount is below the range, the stability in water of the water-based resin composition of the urethane resin (U) tends to decrease.

Examples of the chain extender useful in the invention include water, ethylenediamine, diethylenetriamine, NBDA (product name, manufactured by Mitsui Chemicals, Inc.), N-methyl-3,3'-diaminopropylamine, and polyamines such as an adduct of diethylenetriamine with acrylate and hydrolyzed product thereof.

As the solvent used during the process of obtaining the water-based resin compositing of the urethane resin (U), ketones such as methyl ethyl ketone and acetone, esters such as methyl acetate and ethyl acetate, and tetrahydrofuran can be exemplified, but is not particularly limited as long as the solvent has the boiling point of 100° C. or below. These solvents may be used alone or as a mixture of two or more kinds. Using the solvent having a boiling point of above 100° C., that is higher than the boiling point of water, makes difficult to completely distill off only a solvent from the solution after forming an aqueous dispersion, and the solvent with high boiling point remains in the coating thereby affecting the property. Therefore, when such solvent is unavoidably used to exhibit the performance, it is preferably used in the amount of 10 parts by weight or less based on 100 parts by weight of a water-based resin composition of the urethane resin (U).

The water-based resin composition of the urethane resin (U) useful in the invention can be reacted with the other component such as other monomers and resin components so as to be used as a modified product. Further, as for the water-based resin composition of the urethane resin (U) obtained in the invention, a complex obtained by polymerizing at least one or more monomers of acrylic acid, acrylate ester, methacrylic acid, methacrylate ester, acrylamide, methacrylamide, styrene, acrylonitrile, butadiene, vinyl acetate, ethylene, propylene, itaconic acid, and maleic acid, can be used.

For the water-based resin composition of the urethane resin (U) obtained in such manner, it is preferable that the breaking elongation rate is from 0.1 to 800%. Further, in order to improve the stability in water, the surfactant (L) can be used.

Resin (G) Formed from Copolymerizable Monomer (G-1) Including Monomer which has α,β-Monoethylenic Unsaturated Group and Other Copolymerizable Monomer As the copolymerizable monomer (G-1) constituting the water-based resin composition of the resin (G) formed from the copolymerizable monomer (G-1) which includes monomer having an α,β-monoethylenic unsaturated group and other copolymerizable monomer, (metha)acrylate esters such as methyl(metha)acrylate, ethyl(metha)acrylate, propyl(metha)acrylate, n-butyl(metha)acrylate, i-butyl(metha)acrylate, tert-butyl(metha)acrylate, n-amyl(metha)acrylate, isoamyl(metha)acrylate, n-hexyl(metha)acrylate, 2-ethylhexyl(metha)acrylate, octyl(metha)acrylate, decyl(metha)acrylate, dodecyl(metha)acrylate, octadecyl(metha)acrylate, stearyl(metha)acrylate, tridecyl(metha)acrylate, lauroyl(metha)acrylate, cyclohexyl(metha)acrylate, benzyl(metha)acrylate, phenyl(metha)acrylate, isoboronyl(metha)acrylate, dicyclopentanyl(metha)acrylate, dicyclopentenyl(metha)acrylate, dimethylaminoethyl(metha)acrylate, and diethylaminoethyl(metha)acrylate; hydroxy group-containing vinyls such as hydroxy ethyl acrylate, 2-hydroxyethyl(metha)acrylate, 2-hydroxypropyl(metha)acrylate, 4-hydroxy butyl acrylate, lactone-modified hydroxyethyl(metha)acrylate, and 2-hydroxy-3-phenoxy propyl acrylate; carboxyl group-containing vinyls such as acrylic acid, methacrylic acid, maleic acid, itaconic acid, fumaric acid, ω-carboxy-polycaprolactone monoacrylate, and monohydroxyethyl acrylate phthalate, and monoesterified products thereof; epoxy group-containing vinyls such as glycidyl(metha)acrylate and methylglycidyl(metha)acrylate; isocyanate group-containing vinyls such as vinyl isocyanate and isopropenyl isocyanate; aromatic vinyls such as styrene, α-methylstyrene, vinyltoluene, and t-butylstyrene; amides such as acrylamide, methacrylamide, N-methylolmethacrylamide, N-methylolacrylamide, diacetone acrylamide, and maleic acid amide; vinyl esters such as vinyl acetate and vinyl propionate; aminoalkyl(metha)acrylates such as N,N-dimethylaminoethyl(metha)acrylate, N,N-diethylaminoethyl(metha)acrylate, N,N-dimethylaminopropyl(metha)acrylate, N,N-dipropylaminoethyl(metha)acrylate, N,N-dibutylaminoethyl(metha)acrylate, and N,N-dihydroxyethylaminoethyl(metha)acrylate; unsaturated sulfonic acids such as styrenesulfonic acid, styrenesulfonic acid soda, and 2-acrylamide-2-methylpropanesulfonic acid; unsaturated phosphorous acids such as mono(2-metacryloyloxyethyl)acid phosphate and mono(2-acryloyloxyethyl)acid phosphate; other acrylonitriles, methacrylnitrile; 2-methoxy ethylacrylate; 2-ethoxy ethylacrylate; ethylene; propylene; α-olefin of $C_4$ to $C_{20}$; 1,2,2,6,6-pentamethyl-4-piperidyl(metha)acrylate; 2,2,6,6-tetramethyl-4-piperidyl(metha)acrylate; 2-(2'-hydroxy-5'-methacryloyloxy ethylphenyl)-2H-benzotriazoles; and the like, can be exemplified. In addition, macromonomers having the monomer or copolymers thereof in the segment and a vinyl group on its terminal can also be employed.

As the copolymerizable monomer useful in the invention which comprises other copolymerizable monomer, anhydrous carboxylic acid such as maleic anhydride and anhydrous citraconic acid, and the like can be exemplified. The methyl(metha)acrylate mentioned above represents methyl acrylate and methyl methacrylate.

The production method of a water-based resin composition of the resin (G) useful in the invention, which is formed from the copolymerizable monomer (G-1) including a monomer having an α,β-monoethylenic unsaturated group and other copolymerizable monomer is not particularly limited, but can be produced according to the well-known method such as a method which comprises adding a basic substance and ion-exchange water to a resin solution obtained by solution polymerizing the copolymerizable monomer (G-1) and the polymerization initiator (I-1) in the organic solvent (H), and then removing the organic solvent; and a method which comprises emulsion polymerizing the copolymerizable monomer (G-1) in water in the presence of the surfactant (L) and the polymerization initiator (I-2) described below.

Of the methods in the invention, for obtaining the water-based resin composition of the resin (G) formed from the copolymerizable monomer (G-1) which includes a monomer having an α,β-monoethylenic unsaturated group and other copolymerizable monomer, it is necessary in the former method that the copolymerizable monomer (G-1) has an acidic group which can be neutralized with a basic substance. Specifically, the synthesis is carried out under conditions of using the carboxyl group-containing vinyls mentioned for the copolymerizable monomer (G-1) and providing an acid value of the resin of 10 mgKOH/g or more. The acid value of the resin is preferably 10 mgKOH/g or more, and more preferably 15 mgKOH/g or more. When the acid value is less than 10 mgKOH/g, the hydrophilicity reduces, thus hardly becomes waterborne resin. The acid value described is a value for the resin (solid) excluding the solvent.

In addition, the organic solvent (H) used is not particularly limited as long as the boiling point is 100° C. or below, and these solvents may be used alone or as in the form of a mixture of two or more kinds. Using the solvent having a boiling point of above 100° C., that is higher than the boiling point of water, makes difficult to completely distill off only a solvent from the solution after forming an aqueous dispersion, and the solvent with high boiling point remains in the coating thereby affecting the property. Therefore, when such solvent is unavoidably used to exhibit the performance, it is preferably used in the amount of 10 parts by weight or less based on 100 parts by weight of a water-based resin composition of the urethane resin (U) formed from the copolymerizable monomer (G-1) which includes a monomer having an α,β-monoethylenic unsaturated group and other copolymerizable monomer.

As the polymerization initiator used for synthesizing the water-based resin composition of the resin (G) of the invention formed from the copolymerizable monomer (G-1) which includes a monomer having an α,β-monoethylenic unsaturated group and other copolymerizable monomer, the above described polymerization initiator (I-1) can be used, and these may be used alone or in a combination of two or more kinds.

As the basic substance used for synthesizing the water-based resin composition of the resin (G) of the invention formed from the copolymerizable monomer (G-1) which includes a monomer having an α,β-monoethylenic unsaturated group and other copolymerizable monomer, the above mentioned basic substances can be used, and the added amount is 50 to 100% by mol of the carboxyl group. These may be a combination of two or more kinds.

As the polymerization initiator (I-2) used for synthesizing the water-based resin composition of the resin (G) of the invention formed from the copolymerizable monomer (G-1) which includes a monomer having an α,β-monoethylenic unsaturated group and other copolymerizable monomer, persulfates such as ammonium persulfate, potassium persulfate, and sodium persulfate, hydrogen peroxide, the mentioned polymerization initiator (I-1), and redox initiators of those above with a metal ion such as iron ion and a reducing agent such as sodium sulfoxylate, formaldehyde, sodium pyrosulfite, sodium hydrogensulfite, L-ascorbic acid, and rongalite, can be exemplified, and one or two or more kinds can be used. The used amount of the initiator is usually from 0.1 to 5 wt % to the total amount of monomers. Further, the above surfactant (L) can also be used to improve the stability in water.

The water-based resin composition of the resin (G) useful in the invention formed from the copolymerizable monomer (G-1) which includes a monomer having an $\alpha,\beta$-monoethylenic unsaturated group and other copolymerizable monomer, has Tg measured by DSC of preferably −60 to 50° C., and more preferably −30 to 30° C. In addition, the weight average molecular weight determined by GPC is preferably from 5,000 to 500,000, and more preferably from 10,000 to 200,000.

Petroleum-Based Hydrocarbon Resin (D)

Examples of the petroleum-based hydrocarbon resin (D) useful in the invention include an aliphatic-based petroleum resin which constitutes tar naphtha C5 fraction as a main material; an aromatic-based petroleum resin which constitutes C9 fraction as a main material; and copolymerized alicyclic groups thereof. Examples also include C5 petroleum resins (resin obtained by polymerizing cracked petroleum naphtha C5 fraction), C9 petroleum resins (resin obtained by polymerizing cracked petroleum naphtha C9 fraction), and C5-C9 copolymerized petroleum resins (resin obtained by copolymerizing C5 fraction and C9 fraction of cracked petroleum naphtha); and further include styrenes, indenes, and cumarone, of tar naphtha fraction, cumaroneindene resins containing other dicyclopentadiene or the like, alkylphenols resins typified by condensation products of p-tertiary butylphenol with acetylene, xylene resins obtained by reacting o-xylene, p-xylene, or m-xylene with formalin, and the like. These may be used alone or in a combination of two or more kinds. Among these, the petroleum-based hydrocarbon resin having the weight average molecular weight measured with GPC of 1,000 to 50,000 is preferable, and of 1,500 to 30,000 is more preferable. In addition, those resins having a polar group are more preferable.

Rosin-Based Resin (E)

As the rosin-based resin (E) useful in the invention, natural rosins, polymerized rosins, modified rosins which is modified with maleic acid, fumaric acid, (metha)acrylic acid, or the like, can be exemplified. As the rosin derivative, esterified products of rosins, phenol-modified products, and esterified products of the phenol-modified products can be exemplified, and also hydrogenated products thereof can be exemplified.

Terpene-Based Resin (F)

As the terpene-based resin (F) useful in the invention, resins formed from α-pinene, β-pinene, limonene, dipentene, terpene phenol, terpene alcohol, terpene aldehyde or the like, aromatic modified terpene resins obtained by polymerizing an aromatic monomer such as styrene to any of α-pinene, β-pinene, limonene, and dipentene, and hydrogenated products thereof can be exemplified. Among these, the terpene phenol resins, the aromatic modified terpene resins, and hydrogenated products thereof, are preferable.

In the invention, the petroleum-based hydrocarbon resin (D), the rosin-based resin (E), and the terpene-based resin (F) can be used in combination.

The invention is characterized in that the water-based resin composition of the thermoplastic elastomer (A) and/or the thermoplastic elastomer (B) in which at last one moiety is modified with a functional group; any of the water-based resin composition of the resin (G) formed from the copolymerizable monomer (G-1) which includes a monomer having an $\alpha,\beta$-monoethylenic unsaturated group and other copolymerizable monomer and the water-based resin composition of the urethane resin (U); and the water-based resin composition of the petroleum-based hydrocarbon resin (D) and/or the rosin-based resin (E) and/or the terpene-based resin (F), are mixed. Here, the term 'mixed' means that the water-based resin compositions, which are each in a stable form are mixed under stirring.

The invention preferably comprises 10 to 98 parts by weight of the water-based resin composition of the thermoplastic elastomer (A) and/or the thermoplastic elastomer (B) in which at last one moiety is modified with a functional group; 1 to 89 parts by weight of any of the water-based resin composition of the resin (G) formed from the copolymerizable monomer (G-1) which includes a monomer having an $\alpha,\beta$-monoethylenic unsaturated group and other copolymerizable monomer, and the water-based resin composition of the urethane resin (U); and 1 to 89 parts by weight of the water-based resin composition of the petroleum-based hydrocarbon resin (D) and/or the rosin-based resin (E) and/or the terpene-based resin (F), while (A) and/or (B), (G) or (U), and (D) and/or (E) and/or (F) are mixed to give the total of 100 parts by weight. The invention more preferably comprises 20 to 80 parts by weight of the water-based resin composition of the thermoplastic elastomer (A) and/or the thermoplastic elastomer (B) in which at last one moiety is modified with a functional group; 10 to 70 parts by weight of any of the water-based resin composition of the resin (G) formed from the copolymerizable monomer (G-1) which includes a monomer having an $\alpha,\beta$-monoethylenic unsaturated group and other copolymerizable monomer, and the water-based resin composition of the urethane resin (U); and 10 to 70 parts by weight of the water-based resin composition of the petroleum-based hydrocarbon resin (D) and/or the rosin-based resin (E) and/or the terpene-based resin (F), while (A) and/or (B), (G) or (U), and (D) and/or (E) and/or (F) are mixed to give the total of 100 parts by weight.

Among the coating materials of the invention, the composition having active hydrogen and/or a hydroxy group can employ a curing agent capable of reacting with the active hydrogen and/or the hydroxy group.

For example, the coating material can be provided as a coating composition having a urethane bond or as a primer by mixing a curing agent having an isocyanate group in the molecule. As the curing agent, those obtained by treating isocyanate groups with a blocking agent such as oximes, lactams, and phenols, which are placed in water, such as Takenate WB series (produced by Mitsui-Takeda Chemicals, Inc.), Elastron BN series (produced by Dai-Ichi Kogyo Seiyaku Co., Ltd.) and the like can be exemplified.

As the curing agent, amino resins, which may be a resin synthesized from at least one of melamine, urea, benzoguanamine, and glycoluril, and formaldehyde and of which the methylol group is partially or entirely alkyl etherified with lower alcohol such as methanol, ethanol, propanol, isopropanol, butanol, and isobutanol, can also be employed.

Further, an oxazoline compound can be employed as a curing agent. Examples of the curing agent include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and the like.

The coating material of the invention and the curing agent capable of reacting with and the active hydrogen and/or the hydroxy group can be used in an arbitrary proportion. When the curing agent capable of reacting with the active hydrogen and/or the hydroxy group is a curing agent having an isocyanate group, the blending proportion is preferably in the range of 0.5:1.0 to 1.0:0.5, and more preferably in the range of 0.8:1.0 to 1.0:0.8, in an equivalent ratio of the active hydrogen to the isocyanate group.

When the curing agent capable of reacting with the active hydrogen and/or the hydroxy group is an amino resin, the blending proportion is preferably in the range of 95/5 to 20/80, and more preferably in the range of 90/10 to 60/40, in a weight ratio of the solid of the coating material of the invention/the amino resin.

When the curing agent capable of reacting with the active hydrogen and/or the hydroxy group is an oxazoline compound, the blending ratio is preferably in the range of 95/5 to 20/80, and more preferably in the range of 90/10 to 60/40 in a weight ratio of the solid of the coating material of the invention/the amino resin. When the curing agent is mixed, the mixture can be employed as it is for coating and hardening, but a reactive catalyst can also be used in combination if necessary.

In addition, if necessary, additives such as lubricants (for example, synthetic wax, natural wax, etc.), an adhesivity-providing agent, a crosslinking agent, film-forming auxiliary, a leveling agent, a viscoelasticity moderator, a wetting agent, a flame retardant (for example, phosphorous-containing resin such as ammonium polyphosphate, phosphate ester, melamine, zinc borate, magnesium hydroxide), a stabilizer, an anti-rust agent, fungicides, an ultraviolet absorbing agent, a weathering stabilizer, a heat stabilizer resistance, an effervescing agent, antifoamer, a wetting agent, a coagulating agent, a gelling agent, an anti-aging agent, a softening agent, a plasticizer, anoderant, an antiblocking agent, a mold-releasing agent, an antisettling agent, antioxidant, an antistatic agent, dye, pigment, filler, an organic solvent, and oils (mineral-based lubricating oil, mineral oil, synthetic oil, vegetable oil, etc.), may be added within the scope of not impairing the purpose of the invention. These additives may be used alone or may be used in a combination of two or more kinds.

The method of coating the coating material of the invention or coating the mixture of the coating material of the invention and a curing agent capable of reacting with the active hydrogen and/or the hydroxy group, is not particularly limited, but is preferably performed by spray coating, for example, performed coating by spraying onto a coated surface with a spray gun. Usually, the coating is easily performed at normal temperature, and the drying method after the coating is also not particularly limited, but can be dried according to an appropriate method such as natural drying and forced drying with heating. The thickness of the coated layer can be appropriately selected depending upon the application of the layered product, thus is not particularly limited.

The coating material of the invention or the mixture of the coating material of the invention and the curing agent capable of reacting with the active hydrogen and/or the hydroxy group can be used by further mixing an aqueous epoxy resin, an aqueous polyester resin, an aqueous alkyd resin, or a coating composition containing the resin thereof, in addition to the ones mentioned above considering its characteristics. In particular, the coating material of the invention or the mixture of the coating material and the curing agent capable of reacting with the active hydrogen and/or the hydroxy group can be used as a coating composition or a primer for various materials such as plastic, metal, paper, wood, fiber, glass, rubber, ceramic, concrete, and asphalt, particularly as a coating composition or a primer for non-treated polyolefin resin films/sheets or molded products, or as a coating composition or a primer for metals such as a steel plate and aluminum, to give a coated film.

EXAMPLES

Hereinafter, the invention will be further explained with reference to production methods of the composition of the invention and various tests, but the invention is not limited by these Examples in any way.

Hereinbelow, parts and % are in a weight standard unless otherwise specified.

Water-based Resin Composition of Thermoplastic Elastomer (A)

Production Example A-1

A mixture of 100 parts by weight of a propylene-butene-ethylene copolymer (produced by Degussa Japan Co. Ltd., VESTOPLAST 792) as the thermoplastic elastomer (A), 10 parts by weight of a maleic anhydride modified polypropylene wax (produced by Mitsui Chemicals, Inc., Hi-wax NP0555A: maleic anhydride grafting amount of 3 wt %) as the acid-modified polypropylene (J), and 3 parts by weight of potassium oleate as the higher fatty acid (K), was fed by a hopper of twin screw extruder (manufactured by Ikegai Iron Works, Ltd., model: PCM-30, L/D=40) at a rate of 3,000 g/hr, next a 20% aqueous solution of potassium hydroxide was successively supplied at a rate of 90 g/hr from a feed hopper provided on a vent area of the same extruder, then successively extruded at heating temperature of 210° C., the extruded resin mixture was cooled to 110° C. with a static mixer equipping a jacket which is provided on the same extruder, and charged into hot water of 80° C., to obtain the water-based resin composition of the thermoplastic elastomer (A). The obtained water-based resin composition had yield: 99%, a solid content concentration: 45%, a pH: 11, and an average particle size: 0.5 μm (microtruck measurement).

Production Example A-2

The water-based resin composition was obtained in the same manner as in Production Example A-1, except that the thermoplastic elastomer (A) was replaced by a propylene-ethylene copolymer (produced by Mitsui Chemicals, Inc., Tafiner S4020). The obtained water-based resin composition had yield: 99%, a solid content concentration: 45%, a pH: 11, and an average particle size: 0.5 μm (microtruck measurement).

Production Example A-3

The water-based resin composition was obtained in the same manner as in Production Example A-1, except that the thermoplastic elastomer (A) was replaced by a hydrogenated product of a styrene-butadiene block copolymer (produced by Asahi Chemical Industry Co. Ltd, Tuftec H1041). The obtained water-based resin composition had yield: 99%, a solid content concentration: 45%, a pH: 11, and an average particle size: 0.5 μm (microtruck measurement).

Production Example A-4

The water-based resin composition was obtained in the same manner as in Production Example A-1, except that the thermoplastic elastomer (A) was replaced by a hydrogenated product of a styrene-butadiene copolymer (produced by JSR Corp., Dynaron 1320P). The obtained water-based resin composition had yield: 99%, a solid content concentration: 45%, a pH: 11, and an average particle size: 0.5 μm (microtruck measurement).

Water-based Resin Composition of Thermoplastic Elastomer (B) in which at Least One Moiety is Modified with Functional Group Production Example B-1

1.2 parts by weight of maleic anhydride and 0.2 parts by weight of organic peroxide (produced by Nippon Oils And Fats Co., Ltd, Perhexyne 25B) were added to 100 parts by weight of a propylene-butene-ethylene copolymer (produced by Degussa Japan Co. Ltd., VESTOPLAST 792) as the thermoplastic elastomer (A), which were thoroughly mixed, and then subjected to reaction with the use of a twin-screw extruder (manufactured by Nippon Placon Co., Ltd., 30 mm extruder, L/D=42, rotates in the same direction, no vent) under conditions of extruding temperature of 200° C., rotation speed of 500 rotation/minute, and extrusion output of 20 kg/hr, to obtain the thermoplastic elastomer (B) in which at least one moiety is modified with a functional group. To thus-obtained modified product, 10 parts by weight of a maleic anhydride modified polypropylene wax (produced by Mitsui Chemicals, Inc., Hi-wax NP0555A: maleic anhydride grafting amount of 3 wt %) as the acid-modified polypropylene (J) and 3 parts by weight of potassium oleate as the higher fatty acid (K) were fed by a hopper of twin screw extruder (manufactured by Ikegai Iron Works, Ltd., model: PCM-30, L/D=40) at a rate of 3,000 g/hr, next a 20% aqueous solution of potassium hydroxide was successively supplied at a rate of 90 g/hr from a feed hopper provided on a vent area of the same extruder, then successively extruded at heating temperature of 210° C., the extruded resin mixture was cooled to 110° C. with a static mixer equipping a jacket which is provided on the same extruder, and charged into hot water of 80° C., to obtain the water-based resin composition of the thermoplastic elastomer (B) in which at least one moiety is modified with a functional group. The obtained water-based resin composition had yield: 99%, a solid content concentration: 45%, a pH: 11, and an average particle size: 0.5 μm (microtruck measurement).

Production Example B-2

The water-based resin composition was obtained in the same manner as in Production Example B-1, except that the thermoplastic elastomer (B) in which at least one moiety is modified with a functional group was replaced by a hydrogenated product of an acid-modified styrene-butadiene block copolymer (produced by Asahi Chemical Industry Co. Ltd, Tuftec M1943). The obtained water-based resin composition had yield: 99%, a solid content concentration: 45%, a pH: 11, and an average particle size: 0.5 μm (microtruck measurement).

Water-Based Resin Composition of Thermoplastic Elastomer (A) and Thermoplastic Elastomer (B) in which at Least One Moiety is Modified with Functional Group Production Example AB-1

A mixture of 70 parts by weight of VESTOPLAST 792 as the thermoplastic elastomer (A), 30 parts by weight of Tuftec M1943 as the thermoplastic elastomer (B) in which at least one moiety is modified with a functional group, 10 parts by weight of the Hi-wax NP0555A as the acid-modified polypropylene (J), and 3 parts by weight of potassium oleate as the higher fatty acid (K), was fed by a hopper of twin screw extruder (manufactured by Ikegai Iron Works, Ltd., model: PCM-30, L/D=40) at a rate of 3,000 g/hr, next a 20% aqueous solution of potassium hydroxide was successively supplied at a rate of 90 g/hr from a feed hopper provided on a vent area of the same extruder, then successively extruded at heating temperature of 210° C., the extruded resin mixture was cooled to 110° C. with a static mixer equipping a jacket which is provided on the same extruder, and charged into hot water of 80° C., to obtain the water-based resin composition of the thermoplastic elastomer (A) and the thermoplastic elastomer (B) in which at least one moiety is modified with a functional group. The obtained water-based resin composition had yield: 99%, a solid content concentration: 45%, a pH: 11, and an average particle size: 0.5 μm (microtruck measurement).

Water-based Resin Composition of Urethane Resin (U)

Production Example U-1

To a four-necked flask equipped with a stirrer, a thermometer, a reflux condenser, and a nitrogen inlet tube, 399.5 g of polytetramethyleneetherglycol (produced by Hodogaya Chemical Co., Ltd., PTG2000SN), 21.0 g of 2,2-dimethylol butanoic acid, 12.4 g of 1,4-butandediol, 96.3 g of hexamethylene diisocyanate, and 374.0 g of methyl ethyl ketone were charged, and reacted for 6 hours under nitrogen gas atmosphere at 90° C. Thereafter, the reaction mixture was cooled to 60° C., 13.3 g of triethylamine was added thereto, and mixed for 30 minutes at this temperature. Thus obtained prepolymer was mixed with 1275.7 g of a 0.86% aqueous solution of hexamethylenediamine under stirring, and then the methyl ethyl ketone was desolvated under reduced pressure at 60° C., to obtain a water-based resin composition of the urethane resin having a solid content: 30%, an acid value of solid content: 15 KOHmg/g, a pH: 8, and an average particle size: 0.2 μm.

Water-Based Resin Composition of Resin (G) Formed from Copolymerizable Monomer (G-1) Comprising Monomer which has α,β-Monoethylenic Unsaturated Group and Other Copolymerizable Monomer Production Example G-1

To a reaction vessel equipped with a stirrer, a thermometer, a reflux condenser, and a nitrogen inlet tube, 300 g of ion-exchange water and 1 g of sodium lauryl sulfate were charged, and heated to 75° C. under stirring while purging with nitrogen. While maintaining the internal temperature at 75° C., 2 g of potassium persulfate was added thereto as a polymerization initiator and dissolved, and then an emulsified product, which had been prepared by preliminarily adding 200 g of styrene, 220 g of 2-ethylhexylacrylate, and 9 g of methacrylic acid, to 250 g of ion-exchange water, 1 g of sodium lauryl sulfate, and 9 g of acrylamide, was successively added dropwise to the reaction vessel over 6 hours to carry out polymerization. After the dropwise addition, the reaction product was allowed to stand for 5 hours, and was neutralized to obtain the water-based resin composition. Thus obtained water-based resin composition had solid content concentration: 40%, a pH: 8, and average particle size: 0.2 μm.

Production Example G-2

To a four-necked flask equipped with a stirrer, a thermometer, a reflux condenser, and a nitrogen inlet tube, 500 g of toluene and 100 g of ethyl acetate were charged, and the temperature was elevated with heating to 85° C. under nitrogen gas atmosphere. Subsequently, a mixed solution of 150 g of methyl methacrylate, 100 g of ethyl acrylate, 30 g of 2-hydroxyethyl acrylate, and 20 g of methacylic acid as copolymer monomers, and 3 g of a polymerization initiator (hereinafter abbreviated as PBO), was fed over 4 hours to carry out the reaction. 0.2 g of PBO was added at each of 1 hour and 2 hours after the feeding, and subjected to reaction for 2 hours after the last addition to obtain a resin solution. Thus obtained resin solution was neutralized with triethylamine such as to give 100% in theory, deionized water was added such that the nonvolatile content is 40%, and then the toluene and ethyl acetate were removed under reduced pressure, to obtain a water-based resin composition having a solid content: 40% and a pH: 8.

Water-Based Resin Composition of Petroleum-Based Hydrocarbon Resin (D)

Production Example D-1

To a four-necked flask equipped with a stirrer, a thermometer, a reflux condenser, and a nitrogen inlet tube, 300 g of hexane and 300 g of a petroleum resin (produced by Mitsui Chemicals, Inc., Hilets T-480x) were charged, and dissolved with heating under reflux. 500 g of the solution, 250 g of distilled water, and 1.5 g of sodium dodecylbenzenesulfonate (produced by Kao Corporation, Neopelex F-25) were mixed, and stirred for 15 minutes at a rotation speed of 10,000 rpm. Subsequently, 0.7 g of polyacrylic acid (produced by Wako Pure Chemical Industries, Ltd., Hibiswako 304) was added thereto, and mixed under stirring to obtain an emulsified liquid. The hexane in the emulsified liquid was distilled off under reduced pressure with an evaporator to obtain a water-based resin composition of the petroleum-based hydrocarbon resin (D). The obtained water-based resin composition had yield: 98%, a solid content concentration: 50%, a pH: 8, and an average particle size: 0.6 μm (microtruck measurement).

Example 1

To 100 g of the water-based resin composition obtained in Production Example A-1, 1.5 g of a 50% aqueous solution of Olfin E1010 (produced by Nissin Chemical Industry Co., Ltd.) was added dropwise under stirring to be mixed, thereafter, the resultant was mixed with 25 g of the water-based resin composition obtained in Production Example U-1 by dropwise addition, and further mixed with 45 g of the water-based resin composition obtained in Production Example D-1 by dropwise addition, to obtain a coating material.

Example 2

To 100 g of the water-based resin composition obtained in Production Example A-1, 1.5 g of a 50% aqueous solution of Olfin E1010 was added dropwise under stirring to be mixed, thereafter, the resultant was mixed with 25 g of the water-based resin composition obtained in Production Example U-1 by dropwise addition, and further mixed with 45 g of Super Ester E720 (produced by Arakawa Chemical Industries, Ltd.) which is the water-based resin composition of the rosin-based resin by dropwise addition, to obtain a coating material.

Example 3

To 100 g of the water-based resin composition obtained in Production Example A-1, 1.5 g of a 50% aqueous solution of Olfin E1010 was added dropwise under stirring to be mixed, thereafter, the resultant was mixed with 25 g of the water-based resin composition obtained in Production Example U-1 by dropwise addition, and further mixed with 45 g of Nano Lett R1050 (produced by Yasuhara Chemical Co., Ltd.) which is the water-based resin composition of the terpene-based resin by dropwise addition, to obtain a coating material.

Example 4

A coating material was obtained in the same manner as in Example 3, except that 25 g of the water-based resin composition obtained in Production Example U-1 was replaced by 21.4 g of the urethane resin (U): Takelac W615 (produced by Mitsui-Takeda Chemicals, Inc.).

Example 5

A coating material was obtained in the same manner as in Example 3, except that the water-based resin composition obtained in Production Example A-1 was replaced by the water-based resin composition obtained in Production Example A-2.

Example 6

A coating material was obtained in the same manner as in Example 3, except that the water-based resin composition obtained in Production Example A-1 was replaced by the water-based resin composition obtained in Production Example A-3.

Example 7

A coating material was obtained in the same manner as in Example 3, except that the water-based resin composition obtained in Production Example A-1 was replaced by the water-based resin composition obtained in Production Example A-4.

Example 8

A coating material was obtained in the same manner as in Example 3, except that the water-based resin composition obtained in Production Example A-1 was replaced by the water-based resin composition obtained in Production Example B-1.

Example 9

A coating material was obtained in the same manner as in Example 3, except that the water-based resin composition obtained in Production Example A-1 was replaced by the water-based resin composition obtained in Production Example B-2.

Example 10

To 100 g of the water-based resin composition obtained in Production Example A-1, 2.3 g of a 50% aqueous solution of Olfin E1010 was added dropwise under stirring to be mixed, thereafter, the resultant was mixed with 75 g of the water-based resin composition obtained in Production Example U-1 by dropwise addition, and further mixed with 90 g of Nano Lett R1050 which is the water-based resin composition of the terpene-based resin by dropwise addition, to obtain a coating material.

Example 11

To 100 g of the water-based resin composition obtained in Production Example A-1, 1.3 g of a 50% aqueous solution of Olfin E1010 was added dropwise under stirring to be mixed, thereafter, the resultant was mixed with 21.4 g of the water-based resin composition obtained in Production Example U-1 by dropwise addition, and further mixed with 25.7 g of Nano Lett R1050 which is the water-based resin composition of the terpene-based resin by dropwise addition, to obtain a coating material.

Example 12

To 100 g of the water-based resin composition obtained in Production Example AB-1, 1.5 g of a 50% aqueous solution of Olfin E1010 was added dropwise under stirring to be mixed, thereafter, the resultant was mixed with 25 g of the water-based resin composition obtained in Production Example U-1 by dropwise addition, and further mixed with 45 g of Nano Lett R1050 which is the water-based resin composition of the terpene-based resin by dropwise addition, to obtain a coating material.

Example 13

To 100 g of the water-based resin composition obtained in Production Example A-1, 1.5 g of a 50% aqueous solution of Olfin E1010 was added dropwise under stirring to be mixed, thereafter, the resultant was mixed with 25 g of the water-based resin composition obtained in Production Example U-1 was mixed by dropwise addition, and further mixed with 15 g of the water-based resin composition obtained in Production Example D-1 and 30 g of Nano Lett R1050 which is the water-based resin composition of the terpene-based resin by dropwise addition, to obtain a coating material.

Example 14

To 100 g of the water-based resin composition obtained in Production Example A-1, 1.5 g of a 50% aqueous solution of Olfin E1010 was added dropwise under stirring to be mixed, thereafter, the resultant was mixed with 25 g of the water-based resin composition obtained in Production Example U-1 was mixed by dropwise addition, and further mixed with 15 g of Super Ester E720 which is the water-based resin composition of the rosin-based resin and 30 g of Nano Lett R1050 which is the water-based resin composition of the terpene-based resin by dropwise addition, to obtain a coating material.

Example 15

To 100 g of the water-based resin composition obtained in Production Example A-1, 1.5 g of a 50% aqueous solution of Olfin E1010 was added dropwise under stirring to be mixed, thereafter, the resultant was mixed with 25 g of the water-based resin composition obtained in Production Example U-1 by dropwise addition, and further mixed with 10 g of the water-based resin composition obtained in Production Example D-1, 10 g of Super Ester E720 which is the water-based resin composition of the rosin-based resin, and 25 g of Nano Lett R1050 which is the water-based resin composition of the terpene-based resin by dropwise addition, to obtain a coating material.

Example 16

100 g of the water-based resin composition prepared in Example 3 was mixed with 15 parts of a curing agent: Takenate WD-720 (produced by Mitsui-Takeda Chemicals, Inc.) to obtain a coating material.

Example 17

100 g of the water-based resin composition prepared in Example 3 was mixed with 10 parts of a curing agent: Cymel 236 (produced by Cytec Industries Inc.) and 0.8 parts of Catalyst 500 which is a catalyst, to obtain a coating material.

Example 18

100 g of the water-based resin composition prepared in Example 3 was mixed with 15 parts of a curing agent: Epocros K-2020E (produced by Nippon Shokubai Co., Ltd.) to obtain a coating material.

Comparative Example 1

To 100 g of the water-based resin composition obtained in Production Example A-1, 1.1 g of a 50% aqueous solution of Olfin E1010 was added dropwise under stirring to be mixed, and then the resultant was mixed with 25 g of the water-based resin composition obtained in Production Example U-1 by dropwise addition to obtain a coating material.

Comparative Example 2

To 100 g of the water-based resin composition obtained in Production Example A-1, 1.1 g of a 50% aqueous solution of Olfin E1010 was added dropwise under stirring to be mixed, and then the resultant was mixed with 15 g of the water-based resin composition obtained in Production Example D-1 by dropwise addition to obtain a coating material.

Comparative Example 3

To 100 g of the water-based resin composition obtained in Production Example A-1, 1.1 g of a 50% aqueous solution of Olfin E1010 was added dropwise under stirring to be mixed, and then the resultant was mixed with 15 g of Super Ester E720 which is the water-based resin composition of the rosin-based resin by dropwise addition to obtain a coating material.

Comparative Example 4

To 100 g of the water-based resin composition obtained in Production Example A-1, 1.1 g of a 50% aqueous solution of Olfin E1010 was added dropwise under stirring to be mixed, and then the resultant was mixed with 15 g of Nano Lett R1050 which is the water-based resin composition of the terpene-based resin by dropwise addition to obtain a coating material.

Comparative Example 5

To 100 g of the water-based resin composition obtained in Production Example U-1, 1.2 g of a 50% aqueous solution of Olfin E1010 was added dropwise under stirring to be mixed, and then the resultant was mixed with 60 g of Nano Lett R1050 by dropwise addition to obtain a coating material.

Comparative Example 6

A mixture of 55.6 parts by weight of a propylene-butene-ethylene copolymer (produced by Degussa Japan Co. Ltd., VESTOPLAST 750) as the thermoplastic elastomer (A), 44.4 parts by weight of a hydrogenated product of the C9 petroleum resin (produced by Arakawa Chemical Industries, Ltd., Arkon P100), 10 parts by weight of Hi-wax NP0555A as the acid-modified polypropylene (J), and 5 parts by weight of potassium oleate as the higher fatty acid (K), was fed by a hopper of twin screw extruder (manufactured by Ikegai Iron Works, Ltd., model: PCM 30, L/D=40) at a rate of 115 g/hr, next a 20% aqueous solution of potassium hydroxide was successively supplied from a feed hopper provided on a vent area of the same extruder such to obtain a pH between 7 and 13, then successively extruded at heating temperature of 180° C., the extruded resin mixture was cooled to 90° C. with a static mixer equipping a jacket which is provided on the same extruder, and charged into hot water of 80° C., to obtain the water-based resin composition. The obtained water-based resin composition had yield: 99%, a solid content concentration: 45%, a pH: 11, and an average particle size: 0.6 μm (microtruck measurement). 100 parts by weight of the obtained water-based resin composition was mixed with 50 parts by weight of a non-yellowing ether-type urethane resin (produced by Mitsui-Takeda Chemicals, Inc., Takelac W6061), and stirred to obtain a coating material.

Example 19

To 100 g of the water-based resin composition obtained in Production Example A-1, 1.5 g of a 50% aqueous solution of Olfin E1010 was added dropwise under stirring to be mixed, thereafter, the resultant was mixed with 17 g of the water-based resin composition obtained in Production Example G-1 by dropwise addition, and further mixed with 45 g of the water-based resin composition of the petroleum-based hydrocarbon resin obtained in Production Example D-1 by dropwise addition, to obtain a coating material.

Example 20

To 100 g of the water-based resin composition obtained in Production Example A-1, 1.5 g of a 50% aqueous solution of Olfin E1010 was added dropwise under stirring to be mixed, thereafter, the resultant was mixed with 17 g of the water-based resin composition obtained in Production Example G-1 by dropwise addition, and further mixed with 45 g of Super Ester E720 which is the water-based resin composition of the rosin-based resin by dropwise addition, to obtain a coating material.

Example 21

To 100 g of the water-based resin composition obtained in Production Example A-1, 1.5 g of a 50% aqueous solution of Olfin E1010 was added dropwise under stirring to be mixed, thereafter, the resultant was mixed with 17 g of the water-based resin composition obtained in Production Example G-1 by dropwise addition, and further mixed with 45 g of Nano Lett R1050 which is the water-based resin composition of the terpene-based resin by dropwise addition, to obtain a coating material.

Example 22

A coating material is obtained in the same manner as in Example 21, except that 17 g of the water-based resin composition obtained in Production Example G was replaced by 19 g of the water-based resin composition obtained in Production Example G-2.

Example 23

A coating material is obtained in the same manner as in Example 21, except that the water-based resin composition obtained in Production Example A-1 was replaced by the water-based resin composition obtained in Production Example A-2.

Example 24

A coating material is obtained in the same manner as in Example 21, except that the water-based resin composition obtained in Production Example A-1 was replaced by the water-based resin composition obtained in Production Example A-3.

Example 25

A coating material is obtained in the same manner as in Example 21, except that the water-based resin composition obtained in Production Example A-1 was replaced by the water-based resin composition obtained in Production Example A-4.

Example 26

A coating material is obtained in the same manner as in Example 21, except that the water-based resin composition obtained in Production Example A-1 was replaced by the water-based resin composition obtained in Production Example B-1.

Example 27

A coating material is obtained in the same manner as in Example 21, except that the water-based resin composition obtained in Production Example A-1 was replaced by the water-based resin composition obtained in Production Example B-2.

Example 28

To 100 g of the water-based resin composition obtained in Production Example A-1, 2.3 g of a 50% aqueous solution of Olfin E1010 was added dropwise under stirring to be mixed, thereafter, the resultant was mixed with 50 g of the water-based resin composition obtained in Production Example G-1 by dropwise addition, and further mixed with 90 g of Nano Lett R1050 by dropwise addition, to obtain a coating material.

Example 29

To 100 g of the water-based resin composition obtained in Production Example A-1, 1.3 g of a 50% aqueous solution of Olfin E1010 was added dropwise under stirring to be mixed, thereafter, the resultant was mixed with 14 g of the water-based resin composition obtained in Production Example G-1 by dropwise addition, and further mixed with 26 g of Nano Lett R1050 by dropwise addition, to obtain a coating material.

Example 30

To 100 g of the water-based resin composition obtained in Production Example AB-1, 1.5 g of a 50% aqueous solution of Olfin E1010 was added dropwise under stirring to be mixed, thereafter, the resultant was mixed with 17 g of the water-based resin composition obtained in Production Example G-1 by dropwise addition, and further mixed with 45 g of Nano Lett R1050 which is the water-based resin composition of the terpene-based resin by dropwise addition, to obtain a coating material.

Example 31

To 100 g of the water-based resin composition obtained in Production Example A-1, 1.5 g of a 50% aqueous solution of Olfin E1010 was added dropwise under stirring to be mixed, thereafter, the resultant was mixed with 17 g of the water-based resin composition obtained in Production Example G-1 by dropwise addition, and further mixed with 15 g of the water-based resin composition obtained in Production Example D-1 and 30 g of Nano Lett R1050 which is the water-based resin composition of the terpene-based resin, by dropwise addition to obtain a coating material.

Example 32

To 100 g of the water-based resin composition obtained in Production Example A-1, 1.5 g of a 50% aqueous solution of Olfin E1010 was added dropwise under stirring to be mixed, thereafter, the resultant was mixed with 17 g of the water-based resin composition obtained in Production Example G-1 by dropwise addition, and further mixed with 15 g of Super Ester E720 which is the water-based resin composition of the rosin-based resin and 30 g of Nano Lett R1050 which is the water-based resin composition of the terpene-based resin, by dropwise addition to obtain a coating material.

Example 33

To 100 g of the water-based resin composition obtained in Production Example A-1, 1.5 g of a 50% aqueous solution of Olfin E1010 was added dropwise under stirring to be mixed, thereafter, the resultant was mixed with 17 g of the water-based resin composition obtained in Production Example G-1 by dropwise addition, and further mixed with 10 g of the water-based resin composition obtained in Production Example D-1, 10 g of Super Ester E720 which is the water-based resin composition of the rosin-based resin, and 25 g of Nano Lett R1050 which is the water-based resin composition of the terpene-based resin, by dropwise addition to obtain a coating material.

Example 34

100 g of the water-based resin composition prepared in Example 21 was mixed with 15 parts of a curing agent: Takenate WD-720 to obtain a coating material.

Example 35

100 g of the water-based resin composition prepared in Example 21 was mixed with 10 parts of a curing agent: Cymel 236 and 0.8 parts of Catalyst 500 which is a catalyst, to obtain a coating material.

Example 36

100 g of the water-based resin composition prepared in Example 21 was mixed with 15 parts of a curing agent: Epocros K-2020E to obtain a coating material.

Comparative Example 7

To 100 g of the water-based resin composition obtained in Production Example A-1, 1.1 g of a 50% aqueous solution of Olfin E1010 was added dropwise under stirring to be mixed, and then the resultant was mixed with 17 g of the water-based resin composition obtained in Production Example G-1 by dropwise addition to obtain a coating material.

Comparative Example 8

To 100 g of the water-based resin composition obtained in Production Example G-1, 1.2 g of a 50% aqueous solution of Olfin E1010 was added dropwise under stirring to be mixed, and then the resultant was mixed with 90 g of Nano Lett R1050 by dropwise addition to obtain a coating material.

Comparative Example 9

A mixture of 55.6 parts by weight of a propylene-butene-ethylene copolymer (produced by Degussa Japan Co. Ltd., VESTOPLAST 750) as the thermoplastic elastomer (A), 44.4 parts by weight of a hydrogenated product of the C9 petroleum resin (produced by Arakawa Chemical Industries, Ltd., Arkon P100), 10 parts by weight of Hi-wax NP0555A as the acid-modified polypropylene (J), and 5 parts by weight of potassium oleate as the higher fatty acid (K), was fed by a hopper of twin screw extruder (manufactured by Ikegai Iron Works, Ltd., model: PCM-30, L/D=40) at a rate of 115 g/hr, next a 20% aqueous solution of potassium hydroxide was successively supplied from a feed hopper provided on a vent area of the same extruder such to obtain a pH between 7 and 13, and then successively extruded at heating temperature of 180° C. The extruded resin mixture was cooled to 90° C. with a static mixer equipping a jacket which is provided on the same extruder, and charged into hot water of 80° C. to obtain the water-based resin composition 1. The obtained water-based resin composition had yield: 99%, a solid content concentration: 50%, a pH: 11, and an average particle size: 0.6 μm (microtruck measurement).

In addition, to a reaction vessel equipped with a stirrer, a thermometer, a reflux condenser, and a nitrogen inlet tube, 110 g of ion-exchange water and 0.2 g of sodium dodecylbenzenesulfonate were charged, and heated to 70° C. under stirring while purging with nitrogen. While maintaining the internal temperature at 75° C., 1 g of potassium persulfate was added thereto as a polymerization initiator and dissolved, and then a mixture, which had been prepared by preliminarily adding 45 g of styrene, 45 g of 2-ethylhexylacrylate, 10 g of glycidyl methacrylate, and n-dodecylmercaptan, was successively added dropwise to the reaction vessel over 3 hours to carry out polymerization. After the dropwise addition, the reaction product was allowed to stand for 5 hours, and was neutralized to obtain the water-based resin composition 2. Thus obtained water-based resin composition 2 had solid content concentration: 40%, a pH: 8, and average particle size: 0.1 μm.

A coating material was obtained by mixing 100 parts by weight of the obtained water-based resin composition 1 and 50 parts by weight of the water-based resin composition 2 with stirring.

Production of Thermoplastic Elastomer (A)

Propylene-Based Elastomer Production Example A-1-1

To a 2,000 ml polymerization apparatus thoroughly purged with nitrogen, 917 ml of dry hexane, 85 g of 1-butene, and triisobutylaluminum (1.0 mmol) were charged at normal temperature, then the temperature inside the polymerization apparatus was elevated to 65° C., and the system was pressurized with propylene to 0.77 MPa. Thereafter, the pressure of the internal system was pressurized with ethylene to 0.78 MPa. Subsequently, a toluene solution in which 0.002 mmol of dimethylmethylene(3-tert-butyl-5-methylcyclopentadienyl)fluorenylzirconium dichloride and 0.6 mmol, in terms of aluminum, of methylaluminoxane (produced by Tosoh Finechem Corp.) were contacted was added to the polymerization vessel, and polymerization was conducted for 20 minutes while maintaining the internal temperature at 65° C. and the internal pressure at 0.78 MPa by supplying ethylene. 20 ml of methanol was added to terminate the polymerization. After depressurizing, a polymer was precipitated out from the polymerization solution in 2 L of methanol, and was dried in a vacuum at 130° C. for 12 hours. 60.4 g of the polymer was obtained. The obtained polymer had a butene content of 19 mol %, an ethylene content of 13 mol %, no observed melting point, an intrinsic viscosity [η] measured in decalin of 1.7, a melt flow rate (190° C., 2.16 kg) of 8.5 g/10 min, and Mw/Mn of 2.0.

Propylene-Based Elastomer Production Example A-1-2

To a 2,000 ml polymerization apparatus thoroughly purged with nitrogen, 866 ml of dry hexane, 90 g of 1-butene, and triisobutylaluminum (1.0 mmol) were charged at normal temperature, then the temperature inside the polymerization apparatus was elevated to 65° C., and pressurized with propylene to 0.7 MPa. Subsequently, a toluene solution in which 0.002 mmol of dimethylmethylene(3-tert-butyl-5-methylcyclopentadienyl)fluorenylzirconium dichloride and 0.6 mmol, in terms of aluminum, of methylaluminoxane (produced by Tosoh Finechem Corp.) were contacted was added to the propylene•ethylene•α-olefin copolymer (A-3) in the polymerization vessel, and polymerization was conducted for 30 minutes while maintaining the temperature at 65° C. and the pressure of propylene at 0.7 MPa. 20 ml of methanol was added to terminate the polymerization. After depressurizing, a polymer was precipitated out from the polymerization solution in 2 L of methanol, and was dried in a vacuum at 130° C. for 12 hours. 12.5 g of the polymer was obtained. The obtained polymer had a butene content of 27.9 mol %, a melting point of 74.4° C., an intrinsic viscosity [η] measured in decalin of 1.9, a melt flow rate (230° C., 2.16 kg) of 7 g/10 min, and Mw/Mn of 2.10.

Water-Based Resin Composition of Thermoplastic Elastomer (A)

Production Example A-5

A mixture of 100 parts by weight of the propylene-based elastomer obtained in Production Example A-1-1, 10 parts by weight of a maleic anhydride modified polypropylene wax (produced by Mitsui Chemicals, Inc., Hi-wax NP0555A) as the acid-modified polypropylene (J), and 3 parts by weight of potassium oleate as the higher fatty acid (K), was fed by a hopper of twin screw extruder (manufactured by Ikegai Iron Works, Ltd., model: PCM-30, L/D=40) at a rate of 3,000 g/hr, next a 20% aqueous solution of potassium hydroxide was successively supplied at a rate of 90 g/hr from a feed hopper provided on a vent area of the same extruder, then successively extruded at heating temperature of 210° C., the extruded resin mixture was cooled to 110° C. with a static mixer equipping a jacket which is provided on the same extruder, and charged into hot water of 80° C., to obtain the water-based resin composition of the thermoplastic elastomer (A). The obtained water-based resin composition had yield: 99%, a solid content concentration: 45%, a pH: 11, and an average particle size: 0.4 μm (microtruck measurement).

Production Example A-6

The water-based resin composition was obtained in the same manner as in Production Example A-5, except that the thermoplastic elastomer (A) was replaced by the propylene-based elastomer obtained in Production Example A-1-2. The obtained water-based resin composition had yield: 99%, a solid content concentration: 45%, a pH: 11, and an average particle size: 0.4 μm (microtruck measurement).

Synthesis of Propylene-Based Polymer

Production Example 1

To a 2,000 ml polymerization apparatus thoroughly purged with nitrogen, 833 ml of dry hexane, 100 g of 1-butene, and triisobutylaluminum (1.0 mmol) were charged at normal temperature, then the temperature inside the polymerization apparatus was elevated to 40° C., and the system was pressurized with propylene to 0.76 MPa. Thereafter, the pressure of the internal system was pressurized with ethylene to 0.8 MPa. Subsequently, a toluene solution in which 0.001 mmol of dimethylmethylene(3-tert-butyl-5-methylcyclopentadienyl)fluorenylzirconium dichloride and 0.3 mmol, in terms of aluminum, of methylaluminoxane (produced by Tosoh Finechem Corp.) were contacted was added to the polymerization vessel, and polymerization was conducted for 20 minutes while maintaining the temperature at 40° C. and the internal pressure at 0.8 MPa by supplying ethylene. 20 ml of methanol was added to terminate the polymerization. After depressurizing, a polymer was precipitated out from the polymerization solution in 2 L of methanol, and was dried in a vacuum at 130° C. for 12 hours. 36.4 g of the polymer was obtained, which was a propylene•ethylene•butene copolymer (hereinafter abbreviated as PEBR) comprising 17 mol % of an ethylene content and 7 mol % of a butene content, and had a molecular weight distribution (Mw/Mn) measured with GPC of 2.1 and an mm value of 90%. Further, it was unable to confirm a clear melting peak for a heat of fusion determined by DSC.

Production Example 2

To a 2,000 ml polymerization apparatus thoroughly purged with nitrogen, 833 ml of dry hexane, 100 g of 1-butene, and triisobutylaluminum (1.0 mmol) were charged at normal temperature, then the temperature inside the polymerization apparatus was elevated to 70° C., and the system was pressurized with propylene to 0.55 MPa. Thereafter, the pressure of the internal system was pressurized with ethylene to 0.76 MPa. Subsequently, a toluene solution in which 0.001 mmol of diphenylmethylene(3-tert-butyl-5-ethylcyclopentadienyl) (2,7-di-tert-butylfluorenyl)zirconium dichloride and 0.3 mmol, in terms of aluminum, of methylaluminoxane (produced by Tosoh Finechem Corp.) were contacted was added to the polymerization vessel, and polymerization was conducted for 25 minutes while maintaining the temperature at 70° C. and the internal pressure at 0.76 MPa by supplying ethylene. 20 ml of methanol was added to terminate the polymerization. After depressurizing, a polymer was precipitated out from the polymerization solution in 2 L of methanol, and was dried in a vacuum at 130° C. for 12 hours. 137.7 g of the polymer was obtained, which was a propylene•butene•ethylene copolymer (hereinafter abbreviated as PBER) comprising 14 mol % of an ethylene content and 19 mol % of a butene content, and had a molecular weight distribution (Mw/Mn) measured with GPC of 2.0 and an mm value of 90%. Further, it was unable to confirm a clear melting peak for a heat of fusion determined by DSC.

Production of Thermoplastic Elastomer (A)

Production Example A-7

80 parts by weight of PEBR synthesized in Production Example 1 was melt kneaded with 20 parts by weight of homopolypropylene having a melting point of 163° C., MFR of 7 g/10 min, and a propylene content of 99 mol % or more, to obtain a composition pellet.

Production Example A-8

80 parts by weight of PEBR synthesized in Production Example 1 was melt kneaded with 20 parts by weight of random polypropylene having a melting point of 140° C., MFR of 7 g/10 min, a propylene content of 96.3 mol %, an ethylene content of 2.2 mol %, and a butane content of 1.5 mol %, to obtain a composition pellet.

Production Example A-9

80 parts by weight of PBER synthesized in Production Example 2 was melt kneaded with 20 parts by weight of homopolypropylene having a melting point of 163° C., MFR of 7 g/10 min, and a propylene content of 99 mol % or more, to obtain a composition pellet.

Production Example A-10

80 parts by weight of PBER synthesized in Production Example 2 was melt kneaded with 20 parts by weight of random polypropylene having a melting point of 140° C., MFR of 7 g/10 min, a propylene content of 96.3 mol %, an ethylene content of 2.2. mol %, and a butene content of 1.5 mol %, to obtain a composition pellet.

Production Example A-11

90 parts by weight of PBER synthesized in Production Example 2 was melt kneaded with 10 parts by weight of homopolypropylene having a melting point of 163° C., MFR of 7 g/10 min, and a propylene content of 99 mol % or more, to obtain a composition pellet.

Production Example A-12

100 parts by weight of the resin obtained in Production Example A-9, 1 part by weight of maleic anhydride, and 0.08 parts by weight of 2,5-dimethyl-2,5-bis(tert-butylperoxy)hexyne-3 were mixed in a Henschel mixer, and graft modification was carried out using an extruder with a set cylinder temperature of 240° C., to obtain a composition pellet.

Water-Based Resin Composition of Thermoplastic Elastomer (B) in which at Least One Moiety is Modified with Functional Group Production Example B-3

1.2 parts by weight of maleic anhydride and 0.2 parts by weight of organic peroxide (produced by Nippon Oils And Fats Co., Ltd, Perhexyne 25B) were added to 100 parts by weight of the propylene-based elastomer obtained in Production Example A-1, which were thoroughly mixed, and then subjected to reaction with the use of a twin-screw extruder (manufactured by Nippon Placon Co., Ltd., 30 mm extruder, L/D=42, rotates in the same direction, no vent) under conditions of extruding temperature of 200° C., rotation speed of 500 rotation/minute, and extrusion output of 20 kg/hr, to obtain the thermoplastic elastomer (B) in which at least one moiety is modified with a functional group (B1). To thus-obtained modified product (B1), 10 parts by weight of a maleic anhydride modified polypropylene wax (produced by Mitsui Chemicals, Inc., Hi-wax NP0555A: maleic anhydride grafting amount of 3 wt %) as the acid-modified polypropylene (J) and 3 parts by weight of potassium oleate as the higher fatty acid (K) were fed by a hopper of twin screw extruder (manufactured by Ikegai Iron Works, Ltd., model: PCM-30, L/D=40) at a rate of 3,000 g/hr, next a 20% aqueous solution of potassium hydroxide was successively supplied at a rate of 90 g/hr from a feed hopper provided on a vent area of the same extruder, then successively extruded at heating temperature of 210° C., the extruded resin mixture was cooled to 110° C. with a static mixer equipping a jacket which is provided on the same extruder, and charged into hot water of 80° C., to obtain the water-based resin composition of the thermoplastic elastomer (B) in which at least one moiety is modified with a functional group. The obtained water-based resin composition had yield: 99%, a solid content concentration: 45%, a pH: 11, and an average particle size: 0.4 μm (microtruck measurement).

Production Example B-4

The modified thermoplastic elastomer (B2) was obtained in the same manner as in Production Example B-3, except that the propylene-based elastomer before modification for the thermoplastic elastomer (B) in which at least one moiety is modified with a functional group, is replaced by the propylene-based elastomer obtained in Production Example A-6. Thus obtained modified thermoplastic elastomer (B2) was used to obtain a water-based resin composition in the same manner as in Production Example B-3. The obtained water-based resin composition had yield: 99%, a solid content concentration: 45%, a pH: 11, and an average particle size: 0.4 μm (microtruck measurement).

Water-Based Resin Composition of Thermoplastic Elastomer (A) and Thermoplastic Elastomer (B) in which at Least One Moiety is Modified with Functional Group Production Example AB-2

A mixture of 70 parts by weight of the propylene-based elastomer obtained in Production Example A-1 as the thermoplastic elastomer (A), 30 parts by weight of the modified resin (B1) obtained in Production Example B-3 as the thermoplastic elastomer (B) in which at least one moiety is modified with a functional group, 10 parts by weight of the Hi-wax NP0555A as the acid-modified polypropylene (J), and 3 parts by weight of potassium oleate as the higher fatty acid (K), was fed by a hopper of twin screw extruder (manufactured by Ikegai Iron Works, Ltd., model: PCM-30, L/D=40) at a rate of 3,000 g/hr, next a 20% aqueous solution of potassium hydroxide was successively supplied at a rate of 90 g/hr from a feed hopper provided on a vent area of the same extruder, then successively extruded at heating temperature of 210° C., the extruded resin mixture was cooled to 110° C. with a static mixer equipping a jacket which is provided on the same extruder, and charged into hot water of 80° C., to obtain the water-based resin composition of the thermoplastic elastomer (A) and the thermoplastic elastomer (B) in which at least one moiety is modified with a functional group. The obtained water-based resin composition had yield: 99%, a solid content concentration: 45%, a pH: 11, and an average particle size: 0.4 μm (microtruck measurement).

Production Example AB-3

The water-based resin composition was obtained in the same manner as in Production Example AB-2, except that the thermoplastic elastomer (A) was replaced by the propylene-based elastomer obtained in Production Example A-6 and the thermoplastic elastomer (B) in which at least one moiety is modified with a functional group was replaced by the modified resin (B2) obtained in Production Example B-4. The obtained water-based resin composition had yield: 99%, a solid content concentration: 45%, a pH: 11, and an average particle size: 0.4 μm (microtruck measurement).

Water-Based Resin Composition of Urethane Resin (U)

Production Example U-1

To a four-necked flask equipped with a stirrer, a thermometer, a reflux condenser, and a nitrogen inlet tube, 399.5 g of polytetramethyleneetherglycol (produced by Hodogaya Chemical Co., Ltd., PTG2000SN), 21.0 g of 2,2-dimethylol butanoic acid, 12.4 g of 1,4-butandediol, 96.3 g of hexamethylene diisocyanate, and 374.0 g of methyl ethyl ketone were charged, and reacted for 6 hours under nitrogen gas atmosphere at 90° C. Thereafter, the reaction mixture was cooled to 60° C., 13.3 g of triethylamine was added thereto, and mixed for 30 minutes at this temperature. Thus obtained prepolymer was mixed with 1275.7 g of a 0.86% aqueous solution of hexamethylenediamine under stirring, and then the methyl ethyl ketone was desolvated under reduced pressure at 60° C., to obtain a water-based resin composition of the urethane resin having a solid content: 30%, an acid value of solid content: 15 KOHmg/g, a pH: 8, and an average particle size: 0.2 μm.

Water-Based Resin Composition of Petroleum-Based Hydrocarbon Resin (D)

Production Example D-1

To a four-necked flask equipped with a stirrer, a thermometer, a reflux condenser, and a nitrogen inlet tube, 300 g of hexane and 300 g of a petroleum resin (produced by Mitsui Chemicals, Co., Ltd., Highlets T-480×) were charged, and dissolved with heating under reflux. 500 g of the solution, 250 g of distilled water, and 1.5 g of sodium dodecylbenzenesulfonate (produced by Kao Corporation, Neopelex F-25) were mixed, and stirred for 15 minutes at a rotation speed of 10,000 rpm. Subsequently, 0.7 g of polyacrylic acid (produced by Wako Pure Chemical Industries, Ltd., Hibiswako 304) was added thereto, and mixed under stirring to obtain an emulsified liquid. The hexane in the emulsified liquid was distilled off under reduced pressure with an evaporator to obtain a water-based resin composition of the petroleum-based hydrocarbon resin (D). The obtained water-based resin composition had yield: 98%, a solid content concentration: 50%, a pH: 8, and an average particle size: 0.6 μm (microtruck measurement).

Example 37

To 100 g of the water-based resin composition obtained in Production Example A-5, 3.0 g of a 50% aqueous solution of Olfin E1010 (produced by Nissin Chemical Industry Co., Ltd.) was added dropwise under stirring to be mixed, thereafter, the resultant was mixed with 214 g of the urethane resin (U): Takelac W615 (produced by Mitsui-Takeda Chemicals, Inc.) by dropwise addition, and further mixed with 60 g of the water-based resin composition obtained in Production Example D-1 by dropwise addition, to obtain a coating material.

Example 38

To 100 g of the water-based resin composition obtained in Production Example A-5, 3.0 g of a 50% aqueous solution of Olfin E1010 was added dropwise under stirring to be mixed, thereafter, the resultant was mixed with 214 g of the urethane resin (U): Takelac W615 (produced by Mitsui-Takeda Chemicals, Inc.) by dropwise addition, and further mixed with 60 g of Super Ester E720 (produced by Arakawa Chemical Industries, Ltd.) which is the water-based resin composition of the rosin-based resin by dropwise addition, to obtain a coating material.

Example 39

To 100 g of the water-based resin composition obtained in Production Example A-5, 3.0 g of a 50% aqueous solution of Olfin E1010 was added dropwise under stirring to be mixed, thereafter, the resultant was mixed with 214 g of the urethane resin (U): Takelac W615 (produced by Mitsui-Takeda Chemicals, Inc.) by dropwise addition, and further mixed with 60 g of Nano Lett R1050 (produced by Yasuhara Chemical Co., Ltd.) which is the water-based resin composition of the terpene-based resin by dropwise addition, to obtain a coating material.

Example 40

A coating material was obtained in the same manner as in Example 39, except that the water-based resin composition of the urethane resin (U): Takelac W615 (produced by Mitsui-Takeda Chemicals, Inc.) was replaced by 250 g of the water-based resin composition obtained in Production Example U-1.

Example 41

A coating material was obtained in the same manner as in Example 39, except that the water-based resin composition obtained in Production Example A-5 was replaced by the water-based resin composition obtained in Production Example A-6.

Example 42

A coating material was obtained in the same manner as in Example 39, except that the water-based resin composition obtained in Production Example A-5 was replaced by the water-based resin composition obtained in Production Example B-3.

Example 43

A coating material was obtained in the same manner as in Example 39, except that the water-based resin composition obtained in Production Example A-5 was replaced by the water-based resin composition obtained in Production Example B-4.

Example 44

To 100 g of the water-based resin composition obtained in Production Example A-5, 9 g of a 50% aqueous solution of Olfin E1010 was added dropwise under stirring to be mixed, thereafter, the resultant was mixed with 375 g of the urethane resin (U): Takelac W615 (produced by Mitsui-Takeda Chemicals, Inc.) by dropwise addition, and further mixed with 135 g of Nano Lett R1050 which is the water-based resin composition of the terpene-based resin by dropwise addition, to obtain a coating material.

Example 45

To 100 g of the water-based resin composition obtained in Production Example AB-2, 3.0 g of a 50% aqueous solution of Olfin E1010 was added dropwise under stirring to be mixed, thereafter, the resultant was mixed with 214 g of the urethane resin (U): Takelac W615 (produced by Mitsui-Takeda Chemicals, Inc.) by dropwise addition, and further mixed with 60 g of Nano Lett R1050 which is the water-based resin composition of the terpene-based resin by dropwise addition, to obtain a coating material.

Example 46

A coating material was obtained in the same manner as in Example 45, except that the water-based resin composition obtained in Production Example AB-2 was replaced by the water-based resin composition obtained in Production Example AB-3.

Example 47

To 100 g of the water-based resin composition obtained in Production Example A-5, 3.0 g of a 50% aqueous solution of Olfin E1010 (produced by Nissin Chemical Industry Co., Ltd.) was added dropwise under stirring to be mixed, thereafter, the resultant was mixed with 214 g of the urethane resin (U): Takelac W615 (produced by Mitsui-Takeda Chemicals, Inc.) by dropwise addition, and further mixed with 30 g of the water-based resin composition obtained in Production Example D-1 and 30 g of Nano Lett R1050 which is the water-based resin composition of the terpene-based resin by dropwise addition, to obtain a coating material.

Example 48

To 100 g of the water-based resin composition obtained in Production Example A-5, 3.0 g of a 50% aqueous solution of Olfin E1010 (produced by Nissin Chemical Industry Co., Ltd.) was added dropwise under stirring to be mixed, thereafter, the resultant was mixed with 214 g of the urethane resin (U): Takelac W615 (produced by Mitsui-Takeda Chemicals, Inc.) by dropwise addition, and further mixed with 30 g of Super Ester E720 which is the water-based resin composition of the rosin-based resin and 30 g of Nano Lett R1050 which is the water-based resin composition of the terpene-based resin by dropwise addition, to obtain a coating material.

Example 49

To 100 g of the water-based resin composition obtained in Production Example A-5, 3.0 g of a 50% aqueous solution of Olfin E1010 (produced by Nissin Chemical Industry Co., Ltd.) was added dropwise under stirring to be mixed, thereafter, the resultant was mixed with 214 g of the urethane resin (U): Takelac W615 (produced by Mitsui-Takeda Chemicals, Inc.) by dropwise addition, and further mixed with 15 g of the water-based resin composition obtained in Production Example D-1, 15 g of Super Ester E720 which is the water-based resin composition of the rosin-based resin, and 30 g of Nano Lett R1050 which is the water-based resin composition of the terpene-based resin by dropwise addition, to obtain a coating material.

Example 50

100 g of the water-based resin composition prepared in Example 39 was mixed with 15 parts of a curing agent: Takenate WD-720 (produced by Mitsui-Takeda Chemicals, Inc.) to obtain a coating material.

Example 51

100 g of the water-based resin composition prepared in Example 39 was mixed with 10 parts of a curing agent: Cymel 236 (produced by Cytec Industries Inc.) and 0.8 parts of Catalyst 500 which is a catalyst, to obtain a coating material.

Example 52

100 g of the water-based resin composition prepared in Example 39 was mixed with 15 parts of a curing agent: Epocros K-2020E (produced by Nippon Shokubai Co., Ltd.) to obtain a coating material.

Comparative Example 10

To 100 g of the water-based resin composition obtained in Production Example A-5, 2.4 g of a 50% aqueous solution of Olfin E1010 was added dropwise under stirring to be mixed, and then the resultant was mixed with 150 g of the water-based resin composition obtained in Production Example D-1 by dropwise addition to obtain a coating material.

Comparative Example 11

To 100 g of the water-based resin composition obtained in Production Example A-5, 2.4 g of a 50% aqueous solution of Olfin E1010 was added dropwise under stirring to be mixed, and then the resultant was mixed with 150 g of Super Ester E720 which is the water-based resin composition of the rosin-based resin by dropwise addition to obtain a coating material.

Comparative Example 12

To 100 g of the water-based resin composition obtained in Production Example A-5, 2.4 g of a 50% aqueous solution of Olfin E1010 was added dropwise under stirring to be mixed, and then the resultant was mixed with 150 g of Nano Lett R1050 which is the water-based resin composition of the terpene-based resin by dropwise addition to obtain a coating material.

Comparative Example 13

To 100 g of the urethane resin (U): Takelac W615 (produced by Mitsui-Takeda Chemicals, Inc.), 2.8 g of a 50% aqueous solution of Olfin E1010 was added dropwise under stirring to be mixed, and then the resultant was mixed with 60 g of Nano Lett R1050 by dropwise addition to obtain a coating material.

Reference Example 1

To a 500 ml flask, 250 ml of n-decane, 1.25 mmol of triisobutylaluminum, 0.15 mmol of diphenyldimethoxysilane, and 0.025 mmol, in terms of a titanium atom, of a titanium catalyst supported on magnesium chloride were added, the mixture was heated to 70° C., and there carried out a successive introduction of ethylene at 10 dm$^3$/hr, propylene at 120 dm$^3$/hr, 1-butene at 80 dm$^3$/hr, and hydrogen at 10 dm$^3$/hr to a solvent under normal pressure, to perform polymerization for 30 minutes at 70° C. For the polymerization, the solution polymerization was carried out. The polymerization was terminated by adding isobutyl alcohol, and a total amount of polymer was precipitated in large amount of methanol and dried overnight in a vacuum at 120° C., to obtain a propylene-based elastomer (Here, the elastomer had an intrinsic viscosity [η] measured at 135° C. in decalin of 2.00 and a molecular weight distribution (Mw/Mn) of 5.1). A mixture of 44.4 parts by weight of the obtained propylene-based elastomer, 10 parts by weight of the Hi-wax NP0555A as the acid-modified polypropylene (J), and 5 parts by weight of potassium oleate as the higher fatty acid (K), was fed by a hopper of twin screw extruder (manufactured by Ikegai Iron Works, Ltd., model: PCM-30, L/D=40) at a rate of 115 g/hr, next a 20% aqueous solution of potassium hydroxide was successively supplied from a feed hopper provided on a vent area of the same extruder such to obtain a pH between 7 and 13, then successively extruded at heating temperature of 180° C., the extruded resin mixture was cooled to 90° C. with a static mixer equipping a jacket which is provided on the same extruder, and charged into hot water of 80° C., to obtain the water-based resin composition. The obtained water-based resin composition had yield: 99%, a solid content concentration: 50%, a pH: 11, and an average particle size: 0.6 μm (microtruck measurement). To 100 parts by weight of the obtained water-based resin composition, 3.0 g of a 50% aqueous solution of Olfin E1010 was added dropwise, thereafter, the resultant was mixed with 214 g of the waterborne urethane resin (U): Takelac W615 (produced by Mitsui-Takeda Chemicals, Inc.) by dropwise addition, and further mixed with 60 g of Nano Lett R1050 (produced by Yasuhara Chemical Co., Ltd.) which is the water-based resin composition of the terpene-based resin by dropwise addition, to obtain a coating material.

Reference Example 2

To a 2 liter of autoclave thoroughly purged with nitrogen, 830 ml of hexane and 100 g of 1-butene were charged, 1 mmol of triisobutylaluminum was added thereto, and heated to 70° C. Thereafter, propylene was supplied to give a total pressure of 0.69 MPaG, and 1 mmol of triethylaluminum and 0.005 mmol, in terms of a titanium atom, of a titanium catalyst supported on magnesium chloride were added to carry out polymerization for 30 minutes while maintaining the total pressure at 0.69 MPaG by successively supplying propylene. After the polymerization and degassing, the polymer was collected from a large amount of methanol, and dried in a vacuum at 110° C. for 12 hours, to obtain a propylene-based elastomer (Here, the elastomer had an intrinsic viscosity [η] measured at 135° C. in decalin of 1.89 and a molecular weight distribution (Mw/Mn) of 3.5). A mixture of 44.4 parts by weight of the obtained propylene-based elastomer, 10 parts by weight of the Hi-wax NP0555A as the acid-modified polypropylene (J), and 5 parts by weight of potassium oleate as the higher fatty acid (K), was fed by a hopper of twin screw extruder (manufactured by Ikegai Iron Works, Ltd., model: PCM-30, L/D=40) at a rate of 115 g/hr, next a 20% aqueous solution of potassium hydroxide was successively supplied from a feed hopper provided on a vent area of the same extruder such to obtain a pH between 7 and 13, then successively extruded at heating temperature of 180° C., the extruded resin mixture was cooled to 90° C. with a static mixer equipping a jacket which is provided on the same extruder, and charged into hot water of 80° C., to obtain the water-based resin composition. The obtained water-based resin composition had yield: 99%, a solid content concentration: 50%, a pH: 11, and an average particle size: 0.6 μm (microtruck measurement). To 100 parts by weight of the obtained water-based resin composition, 3.0 g of a 50% aqueous solution of Olfin E1010 was added dropwise, thereafter, the resultant was mixed with 214 g of the waterborne urethane resin (U): Takelac W615 (produced by Mitsui-Takeda Chemicals, Inc.) by dropwise addition, and further mixed with 60 g of Nano Lett R1050 (produced by Yasuhara Chemical Co., Ltd.) which is the water-based resin composition of the terpene-based resin by dropwise addition, to obtain a coating material.

Example 53

A mixture of 100 parts by weight of the resin obtained in Production Example A-7 as the thermoplastic elastomer (A), 10 parts by weight of a maleic anhydride modified polypropylene wax (produced by Mitsui Chemicals, Inc., Hi-wax NP0555A: maleic anhydride grafting amount of 3 wt %) as the acid-modified polypropylene (F), and 3 parts by weight of potassium oleate as the higher fatty acid (K), was fed by a hopper of twin screw extruder (manufactured by Ikegai Iron Works, Ltd., model: PCM-30, L/D=40) at a rate of 3,000 g/hr, next a 20% aqueous solution of potassium hydroxide was successively supplied at a rate of 90 g/hr from a feed hopper provided on a vent area of the same extruder, then successively extruded at heating temperature of 210° C., the extruded resin mixture was cooled to 110° C. with a static mixer equipping a jacket which is provided on the same extruder, and charged into hot water of 80° C., to obtain the aqueous dispersion. The obtained aqueous dispersion had yield: 99%, a solid content concentration: 45%, a pH: 11, and an average particle size: 0.5 μm (microtruck measurement).

Example 54

An aqueous dispersion was obtained in the same manner as in Example 53, except that the thermoplastic elastomer (A) was replaced by the resin obtained in Production Example A-8. The obtained aqueous dispersion had yield: 99%, a solid content concentration: 45%, a pH: 11, and an average particle size: 0.5

Example 55

An aqueous dispersion was obtained in the same manner as in Example 53, except that the thermoplastic elastomer (A9) was replaced by the resin obtained in Production Example A-9. The obtained aqueous dispersion had yield: 99%, a solid content concentration: 45%, a pH: 11, and an average particle size: 0.5 μm.

Example 56

An aqueous dispersion was obtained in the same manner as in Example 53, except that the thermoplastic elastomer (A) was replaced by the resin obtained in Production Example A-10. The obtained aqueous dispersion had yield: 99%, a solid content concentration: 45%, a pH: 11, and an average particle size: 0.5 μm.

Example 57

An aqueous dispersion was obtained in the same manner as in Example 53, except that the thermoplastic elastomer (A) was replaced by the resin obtained in Production Example A-11. The obtained aqueous dispersion had yield: 99%, a solid content concentration: 45%, a pH: 11, and an average particle size: 0.5 μm.

Example 58

An aqueous dispersion was obtained in the same manner as in Example 53, except that the thermoplastic elastomer (A) was replaced by the resin obtained in Production Example A-12 which is the thermoplastic elastomer (B) obtained by modifying at least one moiety in the thermoplastic elastomer (A) with a functional group. The obtained aqueous dispersion had yield: 99%, a solid content concentration: 45%, a pH: 11, and an average particle size: 0.5 μm.

[Evaluation and Results (Examples 1 to 52, Comparative Examples 1 to 13, and Reference Examples 1 and 2)]

<Stability of Coating Material>

The coating materials obtained in Examples and Comparative Examples were allowed to stand still for 1 month in each of conditions of 40% nonvolatile content, room temperature, and 40° C. Then the liquid conditions were evaluated. After a lapse of 1 month, coating materials in which no separation and deposition are confirmed are shown as ○, separation and/or deposition are/is observed but easily dispersed by stirring are shown as Δ, and separation and/or deposition are/is observed and cannot easily be dispersed by stirring are shown as x. For coating materials obtained in Examples 13 to 15, Examples 34 to 36, and Examples 50 to 52, tests for being kept at room temperature only are carried out. Results obtained from Examples are shown in Table-1, Table-3, and Table-5, and results obtained from Comparative Examples are shown in Table-2, Table-4, and Table-6.

<Spray Adequacy of Coating Material>

The coating materials obtained in Examples and Comparative Examples were sprayed by means of a coating gun (wider spray gun (Model; W-88-13H5G) manufactured by Iwata Tosoki Co., Ltd) under conditions of an atomizing pressure of 4 kg/cm², one rotation-opening nozzle, and internal coating booth temperature of 30° C., and observed whether the thread is formed or not. Materials not forming the thread are shown as ○, forming even one thread are shown as x, and results obtained from Examples are shown in Table-1, Table-3, and Table-5 and results obtained from Comparative Examples are shown in Table-2, Table-4, and Table-6.

<Properties of Coated Film>

Polypropylene-Made Substrate

The coating materials obtained in Examples and Comparative Examples were each coated on a polypropylene-made (manufactured by Mitsui Sumitomo Polyolefin Co., Ltd., trade name: J705) square plate of which the surface is wiped with isopropyl alcohol, such that the dried film thickness is 10 μm, then placed in an oven at 80° C. (120° C. for Examples 37 to 52 and Comparative Examples 10 to 13) and treated for 30 minutes. Onto the coated film, a white coating composition (produced by Nippon Bee Chemical Co., Ltd., mixed in the proportion of product name; R278 (base resin)/R271 (curing agent)=8/2) for top coating was coated to give a dried film thickness of 80 μm, and a coated film was formed. Thus formed coated film was allowed to stand for 10 minutes at room temperature, then placed in an oven at 80° C., and treated for 30 minutes to prepare test pieces. With the use of the test pieces, a cross cut peeling and a peeling strength after 24 hours were tested and measured, respectively, a gloss retention and a cross cut peeling after the weather resistance test were tested, and an appearance and a cross cut peeling after the hot water resistance test were tested. Here, the pieces not showing the peeling strength after 24 hours of 800 g/cm or more were not subjected to each of tests for weather resistance and hot water resistance. In addition, the coated films which are not coated with the top coating composition were only subjected to a cross cut peeling test. The coating materials obtained in Examples 16 to 18, Examples 34 to 36, and Examples 50 to 52 were each coated on the polypropylene-made square plate to give a dried film thickness of 20 μm, then placed in an oven at 110° C. (120° C. for Examples 50 to 52) and treated for 30 minutes to prepare test pieces. For these test pieces, a cross cut peeling after 24 hours and the presence or absence of stickiness were tested. The evaluated results obtained from Examples are shown in Table-1, Table-3, and Table-5, and results obtained from Comparative Examples are shown in Table-2, Table-4, and Table-6.

Olefin-Based Thermoplastic Elastomer-Made Substrate

The coating materials obtained in Examples and Comparative Examples were each coated on a Tafiner A4070 (produced by Mitsui Chemicals, Inc.) square plate and a millastomer 8030 (produced by Mitsui Chemicals, Inc.) square plate employed as the olefin-based thermoplastic elastomer, of which the surface is wiped with isopropyl alcohol, such that the dried film thickness is 10 μm, then placed in an oven at 80° C. (100° C. for Examples 37 to 40, 43 and 44, 46 to 52, and Comparative Examples 10 to 12) and treated for 30 minutes. Onto the coated film, a white coating composition (produced by Nippon Bee Chemical Co., Ltd., mixed in the proportion of product name; R278 (base resin)/R271 (curing agent)=8/2) for top coating was coated to give a dried film thickness of 80 μm, and a coated film was formed. Thus formed coated film was allowed to stand for 10 minutes at room temperature, then placed in an oven at 80° C., and treated for 30 minutes to prepare test pieces. With the use of the test pieces, a cross cut peeling after 24 hours was tested. The evaluated results obtained from Examples are shown in Table-1, Table-3, and Table-S, and results obtained from Comparative Examples are shown in Table-2, Table-4, and Table-6.

Steel Plate Substrate

The coating materials obtained in Examples and Comparative Examples were each coated on an electrodeposition-coated surface of a steel plate, where the surface is wiped with isopropyl alcohol and subjected to a surface treatment with a well known electrodeposition epoxy coating composition (thickness of about 20 μm), such that the dried film thickness is 10 μm, then placed in an oven at 100° C. (120° C. for Examples 37 to 52 and Comparative Examples 10 to 13), and treated for 30 minutes. Onto the coated film, a white coating composition (produced by Nippon Bee Chemical Co., Ltd., mixed in the proportion of product name; R278 (base resin)/R271 (curing agent)=8/2) for top coating was coated to give a dried film thickness of 80 μm, and a coated film was formed. Thus formed coated film was allowed to stand for 10 minutes at room temperature, then placed in an oven at 80° C., and treated for 30 minutes to prepare test pieces. With the use of the test pieces, a cross cut peeling after 24 hours was tested. The evaluated results obtained from Examples are shown in Table-1, Table-3, and Table-S, and results obtained from Comparative Examples are shown in Table-2, Table-4, and Table-6.

Cross Cut Peeling Test

A test piece having cross cuts was prepared in accordance with a method for cross cut peeling test as defined in JIS-K-5400, and a cello tape (registered trademark) was adhered to the cross cuts. Thereafter, the tape was drawn quickly at a direction of 90° to peel it off and the number of cross cuts from which the coated film was not peeled off was counted within 100 cross cuts for evaluation.

Peeling Strength Measurement

A coating film was formed on a substrate and a cut having a 1 cm width was formed, and then the edge thereof was released. Thereafter, the released edge was pulled at a direction of 180° at a rate of 50 mm/min and the peeling strength was measured. The peeling strength of 800 g/cm or more is shown as ○, and the peeling strength of less than 800 g/cm is shown as x. For Examples 37 to 52 and Comparative Examples 10 to 13, the peeling strength of 1,000 g/cm or more is shown as ○, and the peeling strength of less than 1,000 g/cm is shown as x.

Weather Resistance Test

After the accelerated weathering test was carried out in accordance with the disclosure in JIS-K-5400 by means of a carbon-arc sunshine lamp for 1000 hours, the cross cut peeling test and gloss retention were evaluated.

Gloss Retention Measurement

The gloss retention of the measured value obtained from the 60° specular gloss (JIS-K-5400) before and after the treatment was calculated by the equation: gloss retention (%)= (gloss after treatment/initial gloss)×100. The gloss retention of 80% or more and no observed color change is evaluated as ○, the gloss retention of 60% or more and under 80% is evaluated as Δ, and under 60% is evaluated as x.

Hot Water Resistance Test

The above test pieces were immersed for 240 hours in hot water adjusted to 40° C., and only such treated pieces were subjected to the evaluation of a coated film appearance and cross cut peeling test.

Coated Film Appearance

The coated film after the test was subjected to an evaluation of observing whether or not the blister is formed, and the coated film with no change is shown as ○, and having a change such as forming blister is shown as x.

[Evaluation and Results (Examples 53 to 58)]

<Stability of Aqueous Dispersion>

The aqueous dispersions obtained in Examples were allowed to stand-still for 1 week in each of conditions of room temperature and 40° C. Then the liquid conditions were evaluated. After a lapse of 1 month, aqueous dispersions in which no separation and deposition are confirmed are shown as ○, and separation and/or deposition are/is observed and cannot easily be dispersed by stirring are shown as x.

<Spray Adequacy of Aqueous Dispersion>

The aqueous dispersions obtained in Examples were sprayed by means of a coating gun (wider spray gun (Model; W-88-13H5G) manufactured by Iwata Tosoki Co., Ltd) under conditions of an atomizing pressure of 4 kg/cm$^2$, one rotation-opening nozzle, and internal coating booth temperature of 30° C., and observed whether or not the thread is formed. The aqueous dispersions not forming the thread are shown as ○, and forming even one thread are shown as x. Results are shown in Table-7.

<Properties of Coated Film>

Polypropylene-Made Substrate 100 parts by weight of each of the aqueous dispersions obtained in Examples was added with 1 part by weight of Olfin E1010 (produced by Nissin Chemical Industry Co., Ltd.) as a wetting agent, and the resultant was coated on a polypropylene-made (manufactured by Mitsui Sumitomo Polyolefin Co., Ltd., trade name: J705) square plate of which the surface is wiped with isopropyl alcohol, such that the dried film thickness is 10 μm, then placed in an oven at 80° C., and treated for 30 minutes to prepare test pieces. With the use of the test pieces, a coated film appearance and cross cut peeling after 24 hours were tested. Results are shown in Table-7.

Olefin-Based Thermoplastic Elastomer-Made Substrate 100 parts by weight of each of the aqueous dispersions obtained in Examples was added with 1 part by weight of Olefin E1010, and the resultant was coated on a Tafiner A4085 (produced by Mitsui Chemicals, Inc.) square plate employed as the olefin-based thermoplastic elastomer, of which the surface is wiped with isopropyl alcohol, such that the dried film thickness is 10 μm, then placed in an oven at 70° C., and treated for 30 minutes to prepare test pieces. With the use of the test pieces, a coated film appearance and cross cut peeling after 24 hours were tested. Results are shown in Table-7.

For the coated film appearance, the dried coated film showing deposition is shown as ○ and not showing deposition is shown as x. For the cross cut peeling test, a test piece having cross cuts was prepared in accordance with a method for cross cut peeling test as defined in JIS-K-5400, and a cello tape (produced by Nichiban Co., Ltd.) was adhered to the cross cuts. Thereafter, the tape was drawn quickly at a direction of 90° to peel it off and the number of cross cuts from which the coated film was not peeled off was counted within 100 cross cuts for evaluation.

Adhesion Between PP Films

The aqueous dispersions obtained in Examples were each coated on a PP film of which the surface is wiped with isopropyl alcohol to give the dried film thickness of 5 μm, and then the coated film was placed in an oven at 70° C. and treated for 5 minutes. Thus obtained film was cut into a strip having the width of 15 mm, applied on a PP film cut in the same form, and adhered with heating at 120° C. for 1 sec under the pressure of 1 kg/cm$^2$ to obtain test pieces. With the use of the test piece, the peeling strength after 24 hours (180°) was measured, and results are shown in Table-7.

In addition, the aqueous dispersion obtained in Example 58 was coated on an aluminum foil to give the dried film thickness of 5 μm, and then the coated film was placed in an oven at 200° C. and treated for 20 seconds. Thus obtained aluminum foil was cut into a strip having the width of 15 mm, applied on a PP film cut in the same form, and adhered with heating at 120° C. for 1 sec under the pressure of 1 kg/cm$^2$ to obtain test pieces. With the use of the test pieces, the peeling strength after 24 hours (180°) was measured, and results are shown in Table-7.

The peeling strength of 500 g/15 mm or more is evaluated as ○, and under 500 g/15 mm is evaluated as x.

TABLE 1

|  |  |  |  |  | Examples |  |  |  |  |  |  |  |  |
|---|---|---|---|---|---|---|---|---|---|---|---|---|---|
|  |  |  |  |  | 1 | 2 | 3 | 4 | 5 | 6 | 7 | 8 | 9 |
|  |  |  | Stability of Coating material |  | ○ | ○ | ○ | ○ | ○ | ○ | ○ | ○ | ○ |
|  |  |  | Spray property of Coating material |  | ○ | ○ | ○ | ○ | ○ | ○ | ○ | ○ | ○ |
| *1 Cp | Polypropylene | *2 Tp | After 24 hours | Cross cut peeling | 100 | 100 | 100 | 100 | 100 | 100 | 100 | 100 | 100 |
|  |  |  |  | Peeling strength | ○ | ○ | ○ | ○ | ○ | ○ | ○ | ○ | ○ |
|  |  |  | Weather resistance | Gloss retention | ○ | ○ | ○ | ○ | ○ | ○ | ○ | ○ | ○ |
|  |  |  |  | Cross cut peeling | 100 | 100 | 100 | 100 | 100 | 100 | 100 | 100 | 100 |
|  |  |  | Hot water resistance | Appearance | ○ | ○ | ○ | ○ | ○ | ○ | ○ | ○ | ○ |
|  |  |  |  | Cross cut peeling | 100 | 100 | 100 | 100 | 100 | 100 | 100 | 100 | 100 |
|  |  | *3 Tn | After 24 hours | Cross cut peeling | 100 | 100 | 100 | 100 | 100 | 100 | 100 | 100 | 100 |
|  |  |  |  | Stickiness |  |  |  |  |  |  |  |  |  |
|  | Tafmer | *2 Tp | After 24 hours | Cross cut peeling | 100 | 100 | 100 | 100 | 100 | 100 | 100 | 100 | 100 |
|  | Millastomer | *2 Tp | After 24 hours | Cross cut peeling | 100 | 100 | 100 | 100 | 100 | 100 | 100 | 100 | 100 |
|  | Steel plate | *2 Tp | After 24 hours | Cross cut peeling | 100 | 100 | 100 | 100 | 100 | 100 | 100 | 100 | 100 |

|  |  |  |  |  | Examples |  |  |  |  |  |  |  |  |
|---|---|---|---|---|---|---|---|---|---|---|---|---|---|
|  |  |  |  |  | 10 | 11 | 12 | 13 | 14 | 15 | 16 | 17 | 18 |
|  |  |  | Stability of Coating material |  | ○ | ○ | ○ | ○ | ○ | ○ | ○ | ○ | ○ |
|  |  |  | Spray property of Coating material |  | ○ | ○ | ○ | ○ | ○ | ○ | ○ | ○ | ○ |
| *1 Cp | Polypropylene | *2 Tp | After 24 hours | Cross cut peeling | 100 | 100 | 100 | 100 | 100 | 100 | 100 | 100 | 100 |
|  |  |  |  | Peeling strength | ○ | ○ | ○ | ○ | ○ | ○ | ○ | ○ | ○ |
|  |  |  | Weather resistance | Gloss retention | ○ | ○ | ○ | ○ | ○ | ○ | ○ | ○ | ○ |
|  |  |  |  | Cross cut peeling | 100 | 100 | 100 | 100 | 100 | 100 | 100 | 100 | 100 |
|  |  |  | Hot water resistance | Appearance | ○ | ○ | ○ | ○ | ○ | ○ | ○ | ○ | ○ |
|  |  |  |  | Cross cut peeling | 100 | 100 | 100 | 100 | 100 | 100 | 100 | 100 | 100 |
|  |  | *3 Tn | After 24 hours | Cross cut peeling | 100 | 100 | 100 | 100 | 100 | 100 | 100 | 100 | 100 |
|  |  |  |  | Stickiness |  |  |  |  |  |  | None | None | None |
|  | Tafmer | *2 Tp | After 24 hours | Cross cut peeling | 100 | 100 | 100 | 100 | 100 | 100 | 100 | 100 | 100 |
|  | Millastomer | *2 Tp | After 24 hours | Cross cut peeling | 100 | 100 | 100 | 100 | 100 | 100 | 100 | 100 | 100 |
|  | Steel plate | *2 Tp | After 24 hours | Cross cut peeling | 100 | 100 | 100 | 100 | 100 | 100 | 100 | 100 | 100 |

*1 Cp: Coated film properties
*2 Tp: Top coating treated
*3 Tn: Top coating non-treated

TABLE 2

|  |  |  |  |  | Comparative Examples |  |  |  |  |  |
|---|---|---|---|---|---|---|---|---|---|---|
|  |  |  |  |  | 1 | 2 | 3 | 4 | 5 | 6 |
|  |  |  | Stability of Coating material |  | ○ | ○ | ○ | ○ | ○ | ○ |
|  |  |  | Spray property of Coating material |  | ○ | ○ | ○ | ○ | ○ | ○ |
| *1 Cp | Polypropylene | *2 Tp | After 24 hours | Cross cut peeling | 0 | 0 | 0 | 0 | 20 | 100 |
|  |  |  |  | Peeling strength | x | x | x | x | x | x |
|  |  | *3 Tn | After 24 hours | Cross cut peeling | 100 | 100 | 100 | 100 | 0 | 100 |
|  | Tafmer | *2 Tp | After 24 hours | Cross cut peeling | 0 | 0 | 0 | 0 | 0 | 100 |
|  | Millastomer | *2 Tp | After 24 hours | Cross cut peeling | 0 | 0 | 0 | 0 | 0 | 100 |
|  | Steel plate | *2 Tp | After 24 hours | Cross cut peeling | 0 | 0 | 0 | 0 | 0 | 100 |

*1 Cp: Coated film properties
*2 Tp: Top coating treated
*3 Tn: Top coating non-treated

TABLE 3

|  |  |  |  |  | Examples |  |  |  |  |  |  |  |  |
|---|---|---|---|---|---|---|---|---|---|---|---|---|---|
|  |  |  |  |  | 19 | 20 | 21 | 22 | 23 | 24 | 25 | 26 | 27 |
|  |  |  | Stability of Coating material |  | ○ | ○ | ○ | ○ | ○ | ○ | ○ | ○ | ○ |
|  |  |  | Spray property of Coating material |  | ○ | ○ | ○ | ○ | ○ | ○ | ○ | ○ | ○ |
| *1 Cp | Polypropylene | *2 Tp | After 24 hours | Cross cut peeling | 100 | 100 | 100 | 100 | 100 | 100 | 100 | 100 | 100 |
|  |  |  |  | Peeling strength | ○ | ○ | ○ | ○ | ○ | ○ | ○ | ○ | ○ |
|  |  |  | Weather resistance | Gloss retention | ○ | ○ | ○ | ○ | ○ | ○ | ○ | ○ | ○ |
|  |  |  |  | Cross cut peeling | 100 | 100 | 100 | 100 | 100 | 100 | 100 | 100 | 100 |
|  |  |  | Hot water resistance | Appearance | ○ | ○ | ○ | ○ | ○ | ○ | ○ | ○ | ○ |
|  |  |  |  | Cross cut peeling | 100 | 100 | 100 | 100 | 100 | 100 | 100 | 100 | 100 |
|  |  | *3 Tn | After 24 hours | Cross cut peeling | 100 | 100 | 100 | 100 | 100 | 100 | 100 | 100 | 100 |
|  |  |  |  | Stickiness |  |  |  |  |  |  |  |  |  |

TABLE 3-continued

| | | | | Examples | | | | | | | | |
|---|---|---|---|---|---|---|---|---|---|---|---|---|
| Tafmer | *2 Tp | After 24 hours | Cross cut peeling | 100 | 100 | 100 | 100 | 100 | 100 | 100 | 100 | 100 |
| Millastomer | *2 Tp | After 24 hours | Cross cut peeling | 100 | 100 | 100 | 100 | 100 | 100 | 100 | 100 | 100 |
| Steel plate | *2 Tp | After 24 hours | Cross cut peeling | 100 | 100 | 100 | 100 | 100 | 100 | 100 | 100 | 100 |

| | | | | Examples | | | | | | | | |
|---|---|---|---|---|---|---|---|---|---|---|---|---|
| | | | | 28 | 29 | 30 | 31 | 32 | 33 | 34 | 35 | 36 |
| | Stability of Coating material | | | ○ | ○ | ○ | ○ | ○ | ○ | ○ | ○ | ○ |
| | Spray property of Coating material | | | ○ | ○ | ○ | ○ | ○ | ○ | ○ | ○ | ○ |
| *1 Cp | Polypropylene | *2 Tp | After 24 hours | Cross cut peeling | 100 | 100 | 100 | 100 | 100 | 100 | 100 | 100 | 100 |
| | | | Peeling strength | ○ | ○ | ○ | ○ | ○ | ○ | ○ | ○ | ○ |
| | | | Weather resistance | Gloss retention | ○ | ○ | ○ | ○ | ○ | ○ | ○ | ○ | ○ |
| | | | | Cross cut peeling | 100 | 100 | 100 | 100 | 100 | 100 | 100 | 100 | 100 |
| | | | Hot water resistance | Appearance | ○ | ○ | ○ | ○ | ○ | ○ | ○ | ○ | ○ |
| | | | | Cross cut peeling | 100 | 100 | 100 | 100 | 100 | 100 | 100 | 100 | 100 |
| | | *3 Tn | After 24 hours | Cross cut peeling | 100 | 100 | 100 | 100 | 100 | 100 | 100 | 100 | 100 |
| | | | | Stickiness | | | | | | | None | None | None |
| Tafmer | | *2 Tp | After 24 hours | Cross cut peeling | 100 | 100 | 100 | 100 | 100 | 100 | 100 | 100 | 100 |
| Millastomer | | *2 Tp | After 24 hours | Cross cut peeling | 100 | 100 | 100 | 100 | 100 | 100 | 100 | 100 | 100 |
| Steel plate | | *2 Tp | After 24 hours | Cross cut peeling | 100 | 100 | 100 | 100 | 100 | 100 | 100 | 100 | 100 |

*1 Cp: Coated film properties
*2 Tp: Top coating treated
*3 Tn: Top coating non-treated

TABLE 4

| | | | | Comparative Examples | | |
|---|---|---|---|---|---|---|
| | | | | 7 | 8 | 9 |
| | Stability of Coating material | | | ○ | ○ | ○ |
| | Spray property of Coating material | | | ○ | ○ | ○ |
| *1 Cp | Polypropylene | *2 Tp | After 24 hours | Cross cut peeling | 0 | 0 | 100 |
| | | | Peeling strength | x | x | x |
| | | *3 Tn | After 24 hours | Cross cut peeling | 100 | 0 | 100 |
| Tafmer | | *2 Tp | After 24 hours | Cross cut peeling | 0 | 0 | 100 |
| Millastomer | | *2 Tp | After 24 hours | Cross cut peeling | 0 | 0 | 100 |
| Steel plate | | *2 Tp | After 24 hours | Cross cut peeling | 0 | 0 | 100 |

*1 Cp: Coated film properties
*2 Tp: Top coating treated
*3 Tn: Top coating non-treated

TABLE 5

| | | | | Examples | | | | | | | | |
|---|---|---|---|---|---|---|---|---|---|---|---|---|
| | | | | 37 | 38 | 39 | 40 | 41 | 42 | 43 | 44 | 45 |
| | Stability of Coating material | | | ○ | ○ | ○ | ○ | ○ | ○ | ○ | ○ | ○ |
| | Spray property of Coating material | | | ○ | ○ | ○ | ○ | ○ | ○ | ○ | ○ | ○ |
| *1 Cp | Polypropylene | *2 Tp | After 24 hours | Cross cut peeling | 100 | 100 | 100 | 100 | 100 | 100 | 100 | 100 | 100 |
| | | | Peeling strength | ○ | ○ | ○ | ○ | ○ | ○ | ○ | ○ | ○ |
| | | | Weather resistance | Gloss retention | ○ | ○ | ○ | ○ | ○ | ○ | ○ | ○ | ○ |
| | | | | Cross cut peeling | 100 | 100 | 100 | 100 | 100 | 100 | 100 | 100 | 100 |
| | | | Hot water resistance | Cross cut peeling | 100 | 100 | 100 | 100 | 100 | 100 | 100 | 100 | 100 |
| | | | | Peeling strength | ○ | ○ | ○ | ○ | ○ | ○ | ○ | ○ | ○ |
| | | *3 Tn | After 24 hours | Cross cut peeling | 100 | 100 | 100 | 100 | 100 | 100 | 100 | 100 | 100 |
| | | | | Stickiness | | | | | | | | | |
| Tafmer | | *2 Tp | After 24 hours | Cross cut peeling | 100 | 100 | 100 | 100 | 100 | 100 | 100 | 100 | 100 |
| Millastomer | | *2 Tp | After 24 hours | Cross cut peeling | 100 | 100 | 100 | 100 | 100 | 100 | 100 | 100 | 100 |
| Steel plate | | *2 Tp | After 24 hours | Cross cut peeling | 100 | 100 | 100 | 100 | 100 | 100 | 100 | 100 | 100 |

| | | | | Examples | | | | | | |
|---|---|---|---|---|---|---|---|---|---|---|
| | | | | 46 | 47 | 48 | 49 | 50 | 51 | 52 |
| | Stability of Coating material | | | ○ | ○ | ○ | ○ | ○ | ○ | ○ |
| | Spray property of Coating material | | | ○ | ○ | ○ | ○ | ○ | ○ | ○ |
| *1 Cp | Polypropylene | *2 Tp | After 24 hours | Cross cut peeling | 100 | 100 | 100 | 100 | 100 | 100 | 100 |
| | | | Peeling strength | ○ | ○ | ○ | ○ | ○ | ○ | ○ |
| | | | Weather resistance | Gloss retention | ○ | ○ | ○ | ○ | ○ | ○ | ○ |
| | | | | Cross cut peeling | 100 | 100 | 100 | 100 | 100 | 100 | 100 |

TABLE 5-continued

|  |  |  | Hot water resistance | Cross cut peeling | 100 | 100 | 100 | 100 | 100 | 100 | 100 |
|---|---|---|---|---|---|---|---|---|---|---|---|
|  |  |  |  | Peeling strength | ○ | ○ | ○ | ○ | ○ | ○ | ○ |
|  |  | *3 Tn | After 24 hours | Cross cut peeling | 100 | 100 | 100 | 100 | 100 | 100 | 100 |
|  |  |  |  | Stickiness |  |  |  |  | None | None | None |
| Tafmer |  | *2 Tp | After 24 hours | Cross cut peeling | 100 | 100 | 100 | 100 | 100 | 100 | 100 |
| Millastomer |  | *2 Tp | After 24 hours | Cross cut peeling | 100 | 100 | 100 | 100 | 100 | 100 | 100 |
| Steel plate |  | *2 Tp | After 24 hours | Cross cut peeling | 100 | 100 | 100 | 100 | 100 | 100 | 100 |

*1 Cp: Coated film properties
*2 Tp: Top coating treated
*3 Tn: Top coating non-treated

TABLE 6

|  |  |  |  |  | Comparative Examples | | | | Reference Examples | |
|---|---|---|---|---|---|---|---|---|---|---|
|  |  |  |  |  | 10 | 11 | 12 | 13 | 1 | 2 |
|  | Stability of Coating material |  |  |  | ○ | ○ | ○ | ○ | ○ | ○ |
|  | Spray property of Coating material |  |  |  | ○ | ○ | ○ | ○ | ○ | ○ |
| *1 Cp | Polypropylene | *2 Tp | After 24 hours | Cross cut peeling | 0 | 0 | 0 | 0 | 100 | 100 |
|  |  |  |  | Peeling strength | x | x | x | x | x | x |
|  |  | *3 Tn | After 24 hours | Cross cut peeling | 100 | 100 | 100 | 0 | 100 | 100 |
| Tafmer |  | *2 Tp | After 24 hours | Cross cut peeling | 0 | 0 | 0 | 0 | 100 | 100 |
| Millastomer |  | *2 Tp | After 24 hours | Cross cut peeling | 0 | 0 | 0 | 0 | 100 | 100 |
| Steel plate |  | *2 Tp | After 24 hours | Cross cut peeling | 0 | 0 | 0 | 0 | 100 | 100 |

*1 Cp: Coated film properties
*2 Tp: Top coating treated
*3 Tn: Top coating non-treated

TABLE 7

|  |  | Examples | | | | | |
|---|---|---|---|---|---|---|---|
|  |  | 53 | 54 | 55 | 56 | 57 | 58 |
|  | Stability of water dispersion | ○ | ○ | ○ | ○ | ○ | ○ |
|  | Spray properties of water dispersion | ○ | ○ | ○ | ○ | ○ | ○ |
| *1 Cp | Polypropylene Coated film Appearance | ○ | ○ | ○ | ○ | ○ | ○ |
|  | Cross cut peeling | 100 | 100 | 100 | 100 | 100 | 100 |
| Olefin-based thermoplastic | Coated film Appearance | ○ | ○ | ○ | ○ | ○ | ○ |
| Elastomer | Cross cut peeling | 100 | 100 | 100 | 100 | 100 | 100 |
| PP film/PP film | Peeling test | ○ | ○ | ○ | ○ | ○ | ○ |
| Aluminum foil/PP film | Peeling test | ○ | ○ | ○ | ○ | ○ | ○ |

*1 Cp: Coated film properties

The invention claimed is:

1. A coating material comprising a mixture of a water-based resin composition of
   a thermoplastic elastomer (A),
      which may optionally be modified with functional groups, and comprises
         a propylene-based elastomer (A-3)
            having a melting point measured by differential scanning calorimetry (DSC) of below 100° C. or no observed melting point,
         and
         an isotactic polypropylene (A-4)
            selected from
            homopolypropylene
               having a copolymer component excluding propylene of 3 mol% or less,
            block polypropylene
               having a normal decane elution rubber component of 3 to 30 wt %,
            and
            random polypropylene
               having the melting point measured by DSC in the range of 110 to 150° C.;
   a water-based resin composition of an urethane resin (U);
   and
   a water-based resin composition of
      a petroleum-based hydrocarbon resin (D) and/or
      a rosin-based resin (E)
         selected from the group consisting of
            natural rosins, polymerized rosins, modified rosins with maleic acid, fumaric acid or (metha)acryric acid, esterified products of rosins, phenol-modified products of rosins, esterified products of the phenol-modified products of rosins
         and
         hydrogenated products thereof
      and/or
      a terpene-based resin (F).

2. The coating material according to claim 1, wherein the propylene-based elastomer (A-3) having a melting point measured by differential scanning calorimetry (DSC) of below 100° C. or no observed melting point is one of a propylene homopolymer or a copolymer of propylene and at least one α-olefin having 2 to 20 carbon atoms excluding propylene, wherein the ethylene content is from 0 to 30 mol% and the α-olefin having 4 to 20 carbon atoms is from 0 to 30 mol%.

3. The coating material according to claim 1, wherein the thermoplastic elastomer (A) comprises 50 to 99.5 wt% of the propylene-based elastomer (A-3) having a melting point measured by differential scanning calorimetry (DSC) of below 100° C. or no observed melting point, and 0.5 to 50 wt% of the isotactic polypropylene (A-4), while (A-3)+(A-4)=100 wt%.

4. A coating composition containing the coating material of claim 1.

5. A primer containing the coating material of claim 1.

6. A coated film, which is formed by coating a substrate with the coating material of claim 1.

7. The coated film according to claim 6, wherein the substrate is a polyolefin-based resin.

8. The coated film according to claim 6, wherein the substrate is a metal.

9. A coating material comprising 10 to 98 parts by weight of
a water-based resin composition of a thermoplastic elastomer (A),
which may optionally be modified with functional groups, and comprises
a propylene-based elastomer (A-3)
having a melting point measured by differential scanning calorimetry (DSC) of below 100° C. or no observed melting point,
and
an isotactic polypropylene (A-4)
selected from
homopolypropylene
having a copolymer component excluding propylene of 3 mol% or less,
block polypropylene
having a normal decane elution rubber component of 3 to 30 wt%,
and
random polypropylene
having the melting point measured by DSC in the range of 110 to 150° C.;
1 to 89 parts by weight of
a water-based resin composition of an urethane resin (U); and
1 to 89 parts by weight of
a water-based resin composition of a petroleum-based hydrocarbon resin (D) and/or
a rosin-based resin (E)
selected from the group consisting of
natural rosins, polymerized rosins, modified rosins with maleic acid, fumaric acid or (metha)acryric acid, esterified products of rosins, phenol-modified products of rosins, esterified products of the phenol-modified products of rosins and hydrogenated products thereof
and/or
a terpene-based resin (F),
wherein the (A), (U), and (D) and/or (E) and/or (F) are mixed to give the total of 100 parts by weight.

10. A coating material comprising a mixture of a water-based resin composition of a thermoplastic elastomer (A),
which may optionally be modified with functional groups, and comprises
a propylene-based elastomer (A-1) and/or a propylene-based elastomer (A-2),
wherein the propylene-based elastomer (A-1) has (1)(a) 50 to 93 mol% of units derived from propylene, (b) 5 to 48 mol% of units derived from a-olefin having 4 to 20 carbon atoms, and (c) 2 to 40 mol% of units derived from ethylene, in such proportion, while the sum of structural units derived from propylene, structural unit derived from ethylene, and structural units derived from α-olefin having 4 to 20 carbon atoms is 100 mol%; (2) an intrinsic viscosity [η] measured at 135° C. in decalin of 0.1 to 12 dl/g; and (3) a molecular weight distribution (Mw/Mn) determined by gel permeation chromatography (GPC) of 3.0 or less, and
wherein the propylene-based elastomer (A-2) has (1)(a) 50 to 95 mol% of units derived from propylene and (b) 5 to 50 mol% of units derived from a-olefin having 4 to 20 carbon atoms; (2) an intrinsic viscosity [η] measured at 135° C. in decalin of 0.1 to 12 dl/g; and (3) a molecular weight distribution (Mw/Mn) determined by gel permeation chromatography (GPC) of 3.0 or less;
a water-based resin composition of an urethane resin (U); and
a water-based resin composition of
a petroleum-based hydrocarbon resin (D) and/or
a rosin-based resin (E)
selected from the group consisting of
natural rosins, polymerized rosins, modified rosins with maleic acid, fumaric acid or (metha)acryric acid, esterified products of rosins, phenol-modified products of rosins, esterified products of the phenol-modified products of rosins
and
hydrogenated products thereof
and/or
a terpene-based resin (F).

* * * * *